US011372165B2

(12) United States Patent
Eberle, Jr. et al.

(10) Patent No.: US 11,372,165 B2
(45) Date of Patent: *Jun. 28, 2022

(54) FLEXIBLE LENSED OPTICAL INTERCONNECT DEVICE FOR SIGNAL DISTRIBUTION

(71) Applicant: CommScope Technologies LLC, Hickory, NC (US)

(72) Inventors: James Joseph Eberle, Jr., Hummelstown, PA (US); Bruce Eltringham Barry, Middletown, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,890

(22) Filed: Sep. 16, 2020

(65) Prior Publication Data

US 2021/0055480 A1 Feb. 25, 2021

Related U.S. Application Data

(63) Continuation of application No. 16/653,253, filed on Oct. 15, 2019, now Pat. No. 10,782,483, which is a
(Continued)

(51) Int. Cl.
*G02B 6/36* (2006.01)
*G02B 6/32* (2006.01)
(Continued)

(52) U.S. Cl.
CPC ............. *G02B 6/3612* (2013.01); *G02B 6/32* (2013.01); *G02B 6/3608* (2013.01);
(Continued)

(58) Field of Classification Search
CPC ... G02B 6/36; G02B 6/32; G02B 6/38; G02B 6/44
See application file for complete search history.

(56) References Cited

U.S. PATENT DOCUMENTS 3,330,105 A 7/1967 Weber
4,359,262 A 11/1982 Dolan
(Continued)

FOREIGN PATENT DOCUMENTS

AU 40995/85 4/1985
AU 55314/86 3/1986
(Continued)

OTHER PUBLICATIONS

International Search Report and Written Opinion for International Application No. PCT/EP2014/070125 dated Feb. 26, 2015 (20 pages).
(Continued)

*Primary Examiner* — Tina M Wong
(74) *Attorney, Agent, or Firm* — Merchant & Gould P.C.

(57) ABSTRACT

A method and device for interconnecting optical components, such as optical fibers and optical circuits, in a flexible, repeatable, and cost-effective manner. Two or more optical components are interconnected by a flexible optical circuit substrate bearing one or more embedded optical fibers with a lens at each end of each fiber. The flexible optical circuit may be incorporated into a housing bearing apertures for receiving the optical connectors of the optical components that are to be interconnected with the device. The lensed ends of the fibers embedded in the flexible optical circuit are positioned adjacent to the apertures for optically connecting to the fibers within the connectors installed in the apertures without conventional mating connectors disposed inside the housing.

10 Claims, 9 Drawing Sheets

Related U.S. Application Data continuation of application No. 16/027,946, filed on Jul. 5, 2018, now Pat. No. 10,451,809, which is a continuation of application No. 15/236,054, filed on Aug. 12, 2016, now Pat. No. 10,031,295, which is a continuation of application No. 13/230,094, filed on Sep. 12, 2011, now Pat. No. 9,417,418.

(51) Int. Cl.
 *G02B 6/44* (2006.01)
 *G02B 6/38* (2006.01)

(52) U.S. Cl.
 CPC ......... *G02B 6/3616* (2013.01); *G02B 6/3897* (2013.01); *G02B 6/4453* (2013.01); *G02B 6/4471* (2013.01)

(56) References Cited

U.S. PATENT DOCUMENTS

| | | |
|---|---|---|
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,725,120 A | 2/1988 | Parzygnat |
| 4,733,936 A | 3/1988 | Mikolaicyk et al. |
| 4,736,100 A | 4/1988 | Vastagh |
| 4,747,020 A | 5/1988 | Brickley et al. |
| 4,765,710 A | 8/1988 | Burmeister et al. |
| 4,792,203 A | 12/1988 | Nelson et al. |
| 4,824,196 A | 4/1989 | Bylander |
| 4,840,449 A | 6/1989 | Ghandeharizadeh |
| 4,861,134 A | 8/1989 | Alameel et al. |
| 4,900,123 A | 2/1990 | Barlow et al. |
| 4,948,220 A | 8/1990 | Violo et al. |
| 4,971,421 A | 11/1990 | Ori |
| 4,986,762 A | 1/1991 | Keith |
| 4,989,946 A | 2/1991 | Williams et al. |
| 4,995,688 A | 2/1991 | Anton et al. |
| 5,011,257 A | 4/1991 | Wettengel et al. |
| 5,023,646 A | 6/1991 | Ishida et al. |
| 5,058,983 A | 10/1991 | Corke et al. |
| 5,067,784 A | 11/1991 | Debortoli et al. |
| 5,071,211 A | 12/1991 | Debortoli et al. |
| 5,073,042 A | 12/1991 | Mulholland et al. |
| 5,076,688 A | 12/1991 | Bowen et al. |
| 5,100,221 A | 3/1992 | Carney et al. |
| 5,109,447 A | 4/1992 | Chan |
| 5,127,082 A | 6/1992 | Below et al. |
| 5,129,021 A | 7/1992 | Mortimore et al. |
| 5,129,030 A | 7/1992 | Petrunia |
| 5,138,688 A | 8/1992 | Debortoli |
| 5,142,598 A | 8/1992 | Tabone |
| 5,142,606 A | 8/1992 | Carney et al. |
| 5,155,785 A | 10/1992 | Holland et al. |
| 5,160,188 A | 11/1992 | Rorke et al. |
| 5,167,001 A | 11/1992 | Debortoli et al. |
| 5,179,618 A | 1/1993 | Anton |
| 5,204,925 A | 4/1993 | Bonanni et al. |
| 5,208,885 A | 5/1993 | Dragone et al. |
| 5,212,761 A | 5/1993 | Petrunia |
| 5,214,735 A | 5/1993 | Henneberger et al. |
| 5,233,674 A | 8/1993 | Vladic |
| 5,235,665 A | 8/1993 | Marchesi et al. |
| 5,259,051 A | 11/1993 | Burack et al. |
| 5,274,729 A | 12/1993 | King et al. |
| 5,274,731 A | 12/1993 | White |
| 5,287,425 A | 2/1994 | Chang |
| 5,289,558 A | 2/1994 | Teichler et al. |
| 5,292,390 A | 3/1994 | Burack et al. |
| 5,317,663 A | 5/1994 | Beard et al. |
| 5,318,259 A | 6/1994 | Fussler |
| 5,327,513 A | 7/1994 | Nguyen et al. |
| 5,333,221 A | 7/1994 | Briggs et al. |
| 5,333,222 A | 7/1994 | Belenkiy et al. |
| 5,335,349 A | 8/1994 | Kutsch et al. |
| 5,353,367 A | 10/1994 | Czosnowsk et al. |
| 5,359,688 A | 10/1994 | Underwood |
| 5,363,440 A | 11/1994 | Daoud |
| 5,363,465 A | 11/1994 | Korkowski et al. |
| 5,363,467 A | 11/1994 | Keith |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,420,958 A | 5/1995 | Henson et al. |
| 5,430,823 A | 7/1995 | Dupont et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,461,690 A | 10/1995 | Lampert |
| 5,469,526 A | 11/1995 | Rawlings |
| 5,475,215 A | 12/1995 | Hsu |
| 5,488,682 A | 1/1996 | Sauter et al. |
| 5,490,229 A | 2/1996 | Ghandeharizadeh et al. |
| 5,497,444 A | 3/1996 | Wheeler |
| 5,509,096 A | 4/1996 | Easley |
| 5,511,144 A | 4/1996 | Hawkins et al. |
| 5,521,992 A | 5/1996 | Chun et al. |
| 5,530,783 A | 6/1996 | Belopolsky et al. |
| 5,542,015 A | 7/1996 | Hultermans |
| 5,548,678 A | 8/1996 | Frost et al. |
| 5,570,450 A | 10/1996 | Fernandez et al. |
| 5,588,076 A | 12/1996 | Peacock et al. |
| 5,613,030 A | 3/1997 | Hoffer et al. |
| 5,636,138 A | 6/1997 | Gilbert et al. |
| 5,636,310 A | 6/1997 | Walles |
| 5,647,043 A | 7/1997 | Anderson et al. |
| 5,655,044 A | 8/1997 | Finzel et al. |
| 5,664,037 A | 9/1997 | Weidman |
| 5,682,452 A | 10/1997 | Takahashi |
| 5,687,266 A | 11/1997 | Leyssens et al. |
| 5,689,604 A | 11/1997 | Janus et al. |
| 5,708,751 A | 1/1998 | Mattei |
| 5,708,753 A | 1/1998 | Frigo et al. |
| 5,715,348 A | 2/1998 | Falkenberg et al. |
| 5,717,810 A | 2/1998 | Wheeler |
| 5,734,776 A | 3/1998 | Puetz |
| 5,734,777 A | 3/1998 | Merriken et al. |
| 5,742,480 A | 4/1998 | Sawada et al. |
| 5,754,720 A | 5/1998 | Quinn et al. |
| 5,758,002 A | 5/1998 | Walters |
| 5,758,003 A | 5/1998 | Wheeler et al. |
| 5,764,839 A | 6/1998 | Igl et al. |
| 5,764,844 A | 6/1998 | Mendes |
| 5,774,245 A | 6/1998 | Baker |
| 5,774,612 A | 6/1998 | Belenkiy et al. |
| 5,781,686 A | 7/1998 | Robinson et al. |
| 5,784,515 A | 7/1998 | Tamaru et al. |
| 5,823,646 A | 10/1998 | Arizpe et al. |
| 5,825,955 A | 10/1998 | Ernst et al. |
| 5,841,917 A | 11/1998 | Jungerman et al. |
| 5,870,519 A | 2/1999 | Jenkins et al. |
| 5,878,179 A | 3/1999 | Schricker |
| 5,883,995 A | 3/1999 | Lu |
| 5,887,095 A | 3/1999 | Nagase et al. |
| 5,889,910 A | 3/1999 | Igl et al. |
| 5,898,811 A | 4/1999 | DiGiovanni et al. |
| 5,903,698 A | 5/1999 | Poremba et al. |
| 5,905,829 A | 5/1999 | Maenishi et al. |
| 5,909,526 A | 6/1999 | Roth et al. |
| 5,917,976 A | 6/1999 | Yamaguchi |
| 5,917,980 A | 6/1999 | Yoshimura et al. |
| 5,930,425 A | 7/1999 | Abel et al. |
| 5,945,633 A | 8/1999 | Ott et al. |
| 5,956,444 A | 9/1999 | Duda et al. |
| 5,966,492 A | 10/1999 | Bechamps et al. |
| 5,969,294 A | 10/1999 | Eberle et al. |

(56) References Cited

U.S. PATENT DOCUMENTS

| | | |
|---|---|---|
| 5,970,196 A | 10/1999 | Greveling et al. |
| 5,971,626 A | 10/1999 | Knodell et al. |
| 5,974,214 A | 10/1999 | Shacklette et al. |
| 5,975,769 A | 11/1999 | Larson et al. |
| 5,981,064 A | 11/1999 | Burack et al. |
| 5,987,203 A | 11/1999 | Abel et al. |
| 6,005,991 A | 12/1999 | Knasel |
| 6,012,852 A | 1/2000 | Kadar-Kallen et al. |
| 6,022,150 A | 2/2000 | Erdman et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,076,975 A | 6/2000 | Roth |
| 6,079,881 A | 6/2000 | Roth |
| 6,097,872 A | 8/2000 | Kusuda et al. |
| 6,149,315 A | 11/2000 | Stephenson |
| 6,157,766 A | 12/2000 | Laniepce et al. |
| 6,160,946 A | 12/2000 | Thompson et al. |
| 6,167,183 A | 12/2000 | Swain |
| 6,181,845 B1 | 1/2001 | Horsthuis et al. |
| 6,188,687 B1 | 2/2001 | Mussman et al. |
| 6,188,825 B1 | 2/2001 | Bandy et al. |
| 6,205,278 B1 | 3/2001 | Sjolinder |
| 6,208,779 B1 | 3/2001 | Rowlette, Sr. et al. |
| 6,208,796 B1 | 3/2001 | Williams Vigliaturo |
| 6,215,938 B1 | 4/2001 | Reitmeier et al. |
| 6,222,976 B1 | 4/2001 | Shahid |
| 6,224,269 B1 | 5/2001 | Engstrand et al. |
| 6,226,431 B1 | 5/2001 | Brown et al. |
| 6,227,717 B1 | 5/2001 | Ott et al. |
| 6,229,933 B1 | 5/2001 | Curzio et al. |
| 6,229,942 B1 | 5/2001 | Engberg et al. |
| 6,234,683 B1 | 5/2001 | Waldron et al. |
| 6,236,795 B1 | 5/2001 | Rodgers |
| 6,240,229 B1 | 5/2001 | Roth |
| 6,256,443 B1 | 7/2001 | Uruno et al. |
| 6,259,844 B1 | 7/2001 | Logan et al. |
| 6,269,214 B1 | 7/2001 | Naudin et al. |
| 6,271,484 B1 | 8/2001 | Tokutsu |
| 6,278,829 B1 | 8/2001 | BuAbbud et al. |
| 6,301,413 B1 | 10/2001 | Bringuier |
| 6,304,690 B1 | 10/2001 | Day |
| 6,317,533 B1 | 11/2001 | Slater et al. |
| RE37,489 E | 1/2002 | Anton et al. |
| 6,338,975 B1 | 1/2002 | Yoshimura et al. |
| 6,347,888 B1 | 2/2002 | Puetz |
| 6,351,590 B1 | 2/2002 | Shahid |
| 6,352,374 B1 | 3/2002 | Selfridge et al. |
| 6,356,690 B1 | 3/2002 | McAlpine et al. |
| 6,356,697 B1 | 3/2002 | Braga et al. |
| 6,360,050 B1 | 3/2002 | Moua et al. |
| 6,363,200 B1 | 3/2002 | Thompson et al. |
| 6,377,738 B1 | 4/2002 | Anderson et al. |
| 6,385,381 B1 | 5/2002 | Janus et al. |
| 6,411,767 B1 | 6/2002 | Burrous et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,442,323 B1 | 8/2002 | Sorosiak |
| 6,445,866 B1 | 9/2002 | Clairadin et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| 6,464,404 B1 | 10/2002 | Robinson et al. |
| D466,087 S | 11/2002 | Cuny et al. |
| 6,480,487 B1 | 11/2002 | Wegleitner et al. |
| 6,480,661 B2 | 11/2002 | Kadar-Kallen et al. |
| 6,483,977 B2 | 11/2002 | Battey et al. |
| 6,493,480 B1 | 12/2002 | Lelic |
| 6,496,638 B1 | 12/2002 | Andersen |
| 6,496,640 B1 | 12/2002 | Harvey et al. |
| 6,504,988 B1 | 1/2003 | Trebesch et al. |
| 6,510,273 B2 | 1/2003 | Ali et al. |
| 6,526,210 B1 | 2/2003 | Harrison et al. |
| 6,532,332 B2 | 3/2003 | Solheid et al. |
| 6,535,682 B1 | 3/2003 | Puetz et al. |
| 6,537,106 B1 | 3/2003 | Follingstad |
| 6,539,147 B1 | 3/2003 | Mahony |
| 6,539,160 B2 | 3/2003 | Battey et al. |
| 6,542,688 B1 | 4/2003 | Battey et al. |
| 6,547,445 B2 | 4/2003 | Kiani |
| 6,547,450 B2 | 4/2003 | Lampert |
| 6,554,483 B1 | 4/2003 | Sun et al. |
| 6,554,485 B1 | 4/2003 | Beatty et al. |
| 6,556,763 B1 | 4/2003 | Puet et al. |
| 6,573,451 B2 | 6/2003 | Komiya et al. |
| 6,577,595 B1 | 6/2003 | Counterman |
| 6,591,051 B2 | 7/2003 | Solheid et al. |
| 6,594,434 B1 | 7/2003 | Davidson et al. |
| 6,594,436 B2 | 7/2003 | Sun et al. |
| 6,597,670 B1 | 7/2003 | Tweedy et al. |
| 6,600,860 B2 | 7/2003 | Sun et al. |
| 6,600,866 B2 | 7/2003 | Gatica et al. |
| 6,614,980 B1 | 9/2003 | Mahony |
| 6,619,853 B2 | 9/2003 | Grois et al. |
| 6,621,975 B2 | 9/2003 | Laporte et al. |
| 6,623,170 B2 | 9/2003 | Petrillo |
| 6,625,375 B1 | 9/2003 | Mahony |
| 6,628,866 B1 | 9/2003 | Wilson et al. |
| 6,631,237 B2 | 10/2003 | Knudsen et al. |
| RE38,311 E | 11/2003 | Wheeler |
| 6,648,376 B2 | 11/2003 | Christianson |
| 6,654,536 B2 | 11/2003 | Battey et al. |
| 6,661,961 B1 | 12/2003 | Allen et al. |
| 6,668,124 B2 | 12/2003 | Kondo et al. |
| 6,668,127 B1 | 12/2003 | Mahony |
| 6,688,780 B2 | 2/2004 | Duran |
| 6,690,862 B1 | 2/2004 | Rietveld |
| 6,690,867 B2 | 2/2004 | Melton et al. |
| 6,697,560 B1 | 2/2004 | Kondo et al. |
| 6,709,607 B2 | 3/2004 | Hibbs-Brenner et al. |
| 6,711,339 B2 | 3/2004 | Puetz et al. |
| 6,736,670 B2 | 5/2004 | Clark et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,761,585 B2 | 7/2004 | Clark et al. |
| 6,763,166 B2 | 7/2004 | Yow, Jr. et al. |
| 6,764,221 B1 | 7/2004 | de Jong et al. |
| 6,768,860 B2 | 7/2004 | Liberty |
| 6,775,458 B2 | 8/2004 | Yow, Jr. et al. |
| 6,778,752 B2 | 8/2004 | Laporte et al. |
| 6,779,906 B1 | 8/2004 | Delmar |
| 6,788,786 B1 | 9/2004 | Kessler et al. |
| 6,788,846 B2 | 9/2004 | Hileman et al. |
| 6,792,190 B2 | 9/2004 | Xin et al. |
| 6,792,191 B1 | 9/2004 | Clapp, Jr. et al. |
| 6,793,399 B1 | 9/2004 | Nguyen |
| 6,793,517 B2 | 9/2004 | Neer et al. |
| 6,796,717 B2 | 9/2004 | Petrillo |
| 6,801,680 B2 | 10/2004 | Lin |
| 6,808,444 B1 | 10/2004 | Kuprin et al. |
| 6,810,193 B1 | 10/2004 | Müller |
| 6,815,612 B2 | 11/2004 | Bloodworth et al. |
| 6,819,821 B2 | 11/2004 | Lacey et al. |
| 6,843,606 B2 | 1/2005 | Deane et al. |
| 6,845,207 B2 | 1/2005 | Schray |
| 6,845,208 B2 | 1/2005 | Thibault et al. |
| 6,850,671 B2 | 2/2005 | Carnevale et al. |
| 6,850,685 B2 | 2/2005 | Tinucci et al. |
| 6,853,795 B2 | 2/2005 | Dagley et al. |
| 6,865,330 B2 | 3/2005 | Lecomte et al. |
| 6,870,734 B2 | 3/2005 | Mertesdorf et al. |
| 6,873,773 B2 | 3/2005 | Sun et al. |
| 6,888,069 B1 | 5/2005 | Chen et al. |
| 6,901,200 B2 | 5/2005 | Schray |
| 6,909,833 B2 | 6/2005 | Henschel et al. |
| 6,912,349 B2 | 6/2005 | Clark et al. |
| 6,916,199 B2 | 7/2005 | Follingstad |
| 6,920,213 B2 | 7/2005 | Pershan |
| 6,920,274 B2 | 7/2005 | Rapp et al. |
| 6,925,241 B2 | 8/2005 | Bohle et al. |

(56) References Cited

U.S. PATENT DOCUMENTS

| | | |
|---|---|---|
| 6,934,457 B2 | 8/2005 | Vincent et al. |
| 6,937,800 B2 | 8/2005 | Cote |
| 6,950,593 B2 | 9/2005 | Hodge et al. |
| 6,959,139 B2 | 10/2005 | Erwin et al. |
| 6,968,111 B2 | 11/2005 | Trebesch et al. |
| 6,980,725 B1 | 12/2005 | Swieconek |
| 6,983,095 B2 | 1/2006 | Reagan et al. |
| H2144 H | 2/2006 | Baechtle et al. |
| 7,006,748 B2 | 2/2006 | Dagley et al. |
| 7,018,113 B1 | 3/2006 | Wang et al. |
| 7,020,359 B2 | 3/2006 | Mayer |
| 7,029,322 B2 | 4/2006 | Ernst et al. |
| 7,058,245 B2 | 6/2006 | Farahi |
| 7,062,177 B1 | 6/2006 | Grivna et al. |
| 7,066,762 B2 | 6/2006 | Neer et al. |
| 7,066,771 B2 | 6/2006 | Clark et al. |
| 7,068,907 B2 | 6/2006 | Schray |
| 7,075,565 B1 | 7/2006 | Raymond et al. |
| 7,086,539 B2 | 8/2006 | Knudsen et al. |
| 7,088,899 B2 | 8/2006 | Reagan et al. |
| 7,090,084 B2 | 8/2006 | Knudsen et al. |
| 7,092,592 B2 | 8/2006 | Verhagen et al. |
| 7,094,095 B1 | 8/2006 | Caveney |
| 7,102,884 B2 | 9/2006 | Mertesdorf et al. |
| 7,103,255 B2 | 9/2006 | Reagan et al. |
| 7,113,686 B2 | 9/2006 | Bellekens et al. |
| 7,130,498 B2 | 10/2006 | Meis et al. |
| 7,139,456 B2 | 11/2006 | Sasaki et al. |
| 7,139,461 B2 | 11/2006 | Puetz et al. |
| 7,142,764 B2 | 11/2006 | Allen et al. |
| 7,142,765 B2 | 11/2006 | Rapp et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,179,119 B2 | 2/2007 | Follingstad |
| 7,186,032 B1 | 3/2007 | Stevens et al. |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,712 B2 | 6/2007 | Arellano |
| 7,233,731 B2 | 6/2007 | Solheid et al. |
| 7,241,182 B2 | 7/2007 | Clark et al. |
| 7,244,144 B2 | 7/2007 | Follingstad |
| 7,248,772 B2 | 7/2007 | Suzuki et al. |
| 7,277,620 B2 | 10/2007 | Vongseng et al. |
| 7,302,153 B2 | 11/2007 | Thom |
| 7,330,546 B2 | 2/2008 | Kessler et al. |
| 7,333,707 B2 | 2/2008 | Puetz et al. |
| 7,335,056 B1 | 2/2008 | Clark et al. |
| 7,346,254 B2 | 3/2008 | Kramer et al. |
| 7,352,921 B2 | 4/2008 | Saito et al. |
| 7,357,667 B2 | 4/2008 | Clark et al. |
| 7,367,823 B2 | 5/2008 | Rapp et al. |
| 7,369,741 B2 | 5/2008 | Reagan et al. |
| 7,376,321 B2 | 5/2008 | Bolster et al. |
| 7,376,322 B2 | 5/2008 | Zimmel et al. |
| 7,376,323 B2 | 5/2008 | Zimmel |
| 7,377,697 B2 | 5/2008 | Kahle et al. |
| 7,391,952 B1 | 6/2008 | Ugolini et al. |
| 7,400,813 B2 | 7/2008 | Zimmel |
| 7,400,816 B2 | 7/2008 | Reagan et al. |
| 7,406,240 B2 | 7/2008 | Murano |
| 7,407,330 B2 | 8/2008 | Smith et al. |
| 7,408,769 B2 | 8/2008 | Mertesdorf et al. |
| 7,412,147 B2 | 8/2008 | Scadden |
| 7,416,349 B2 | 8/2008 | Kramer |
| 7,418,181 B2 | 8/2008 | Zimmel et al. |
| 7,433,915 B2 | 10/2008 | Edwards et al. |
| 7,455,548 B2 | 11/2008 | Clark et al. |
| 7,457,503 B2 | 11/2008 | Solheid et al. |
| 7,460,757 B2 | 12/2008 | Hoehne et al. |
| 7,471,869 B2 | 12/2008 | Reagan et al. |
| 7,493,002 B2 | 2/2009 | Coburn et al. |
| 7,493,044 B2 | 2/2009 | Kozischek et al. |
| 7,496,268 B2 | 2/2009 | Escoto et al. |
| 7,515,805 B2 | 4/2009 | Vongseng et al. |
| 7,519,259 B2 | 4/2009 | Smith et al. |
| 7,532,782 B2 | 5/2009 | Bragg et al. |
| 7,534,135 B2 | 5/2009 | Follingstad |
| 7,543,993 B2 | 6/2009 | Blauvelt et al. |
| 7,544,090 B2 | 6/2009 | Follingstad |
| 7,553,091 B2 | 6/2009 | McColloch |
| 7,555,193 B2 | 6/2009 | Rapp et al. |
| 7,623,749 B2 | 11/2009 | Reagan et al. |
| 7,627,204 B1 | 12/2009 | Deane |
| 7,646,958 B1 | 1/2010 | Reagan et al. |
| 7,668,427 B2 | 2/2010 | Register |
| 7,686,658 B2 | 3/2010 | Clark et al. |
| 7,689,089 B2 | 3/2010 | Wagner et al. |
| 7,706,656 B2 | 4/2010 | Zimmel |
| 7,722,261 B2 | 5/2010 | Kadar-Kallen et al. |
| 7,738,755 B2 | 6/2010 | Shioda |
| 7,738,760 B2 | 6/2010 | Fredrickson et al. |
| 7,747,125 B1 | 6/2010 | Lee et al. |
| RE41,460 E | 7/2010 | Wheeler |
| 7,751,674 B2 | 7/2010 | Hill |
| 7,756,371 B1 | 7/2010 | Burnham et al. |
| 7,773,843 B2 | 8/2010 | Cody et al. |
| 7,775,725 B2 | 8/2010 | Grinderslev |
| 7,805,043 B2 | 9/2010 | Puetz et al. |
| 7,809,232 B2 | 10/2010 | Reagan et al. |
| 7,809,233 B2 | 10/2010 | Smith et al. |
| 7,809,234 B2 | 10/2010 | Smith et al. |
| 7,809,235 B2 | 10/2010 | Reagan et al. |
| 7,822,313 B2 | 10/2010 | Rapp et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,844,161 B2 | 11/2010 | Reagan et al. |
| 7,856,166 B2 | 12/2010 | Biribuze et al. |
| 7,873,255 B2 | 1/2011 | Reagan et al. |
| 7,889,961 B2 | 2/2011 | Cote et al. |
| 7,934,948 B2 | 5/2011 | Follingstad |
| 7,942,004 B2 | 5/2011 | Hodder |
| 7,945,138 B2 | 5/2011 | Hill et al. |
| 7,961,999 B2 | 6/2011 | Frohlich et al. |
| 7,983,521 B2 | 7/2011 | Rapp et al. |
| 8,019,192 B2 | 9/2011 | Puetz et al. |
| 8,032,032 B2 | 10/2011 | Chand et al. |
| 8,041,221 B2 | 10/2011 | Elberbaum |
| 8,059,932 B2 | 11/2011 | Hill et al. |
| 8,078,017 B2 | 12/2011 | Kodama et al. |
| 8,085,472 B2 | 12/2011 | Kadar-Kallen |
| 8,113,723 B2 | 2/2012 | Togami et al. |
| 8,139,913 B2 | 3/2012 | Bolster et al. |
| 8,184,938 B2 | 5/2012 | Cooke et al. |
| 8,195,022 B2 | 6/2012 | Coburn et al. |
| 8,280,205 B2 | 10/2012 | Erdman et al. |
| 8,280,216 B2 | 10/2012 | Cooke et al. |
| 8,292,518 B2 | 10/2012 | Togami et al. |
| 8,313,249 B2 | 11/2012 | Gurreri et al. |
| 8,342,755 B2 | 1/2013 | Nhep |
| 8,358,900 B2 | 1/2013 | Rapp et al. |
| 8,374,477 B2 | 2/2013 | Hill |
| 8,406,587 B2 | 3/2013 | Mudd et al. |
| 8,417,074 B2 | 4/2013 | Nhep et al. |
| 8,428,418 B2 | 4/2013 | Smrha |
| 8,457,458 B2 | 6/2013 | Kadar-Kallen et al. |
| 8,463,091 B2 | 6/2013 | Kewitsch |
| 8,466,848 B2 | 6/2013 | Guy et al. |
| 8,485,737 B2 | 7/2013 | Kolesar |
| 8,588,566 B2 | 11/2013 | Matsuyama et al. |
| 8,600,208 B2 | 12/2013 | Badar et al. |
| 8,649,648 B2 | 2/2014 | Coburn et al. |
| 8,690,593 B2 | 4/2014 | Anderson et al. |
| 8,693,836 B2 | 4/2014 | Kimbrell et al. |
| 8,712,206 B2 | 4/2014 | Cooke et al. |
| 8,886,335 B2 | 11/2014 | Pianca |
| 9,011,020 B2 | 4/2015 | Tan et al. |
| 9,031,360 B2 | 5/2015 | Schneider et al. |
| 9,075,216 B2 | 7/2015 | Cote et al. |
| 9,091,818 B2 | 7/2015 | Kadar-Kallen |
| 9,223,094 B2 | 12/2015 | Schneider |

(56) References Cited

U.S. PATENT DOCUMENTS

| | | |
|---|---|---|
| 9,229,172 B2 | 1/2016 | Eberle, Jr. |
| 9,329,353 B2 | 5/2016 | Solheid et al. |
| 9,341,786 B1 | 5/2016 | Gamache et al. |
| 9,354,416 B2 | 5/2016 | Solheid et al. |
| 9,417,418 B2 | 8/2016 | Eberle, Jr. et al. |
| 9,488,788 B2 | 11/2016 | Murray et al. |
| 9,753,229 B2 | 9/2017 | Murray et al. |
| 9,874,711 B2 | 1/2018 | Schneider et al. |
| 9,897,767 B2 | 2/2018 | Murray et al. |
| 10,031,295 B2 | 7/2018 | Eberle, Jr. et al. |
| 10,067,295 B2 | 9/2018 | Eberle, Jr. |
| 10,149,619 B2 | 12/2018 | Ito et al. |
| 10,295,761 B2 | 5/2019 | Murray et al. |
| 10,317,638 B2 | 6/2019 | Schneider et al. |
| 10,379,311 B1 | 8/2019 | Krywicki et al. |
| 10,451,809 B2 * | 10/2019 | Eberle, Jr. ............ G02B 6/3612 |
| 10,620,382 B2 | 4/2020 | Eberle, Jr. |
| 10,739,534 B2 | 8/2020 | Murray et al. |
| 10,754,096 B2 | 8/2020 | Murray et al. |
| 10,782,483 B2 | 9/2020 | Eberle, Jr. et al. |
| 10,955,633 B2 | 3/2021 | Schneider et al. |
| 11,036,012 B2 | 6/2021 | Murray et al. |
| 2001/0009136 A1 | 7/2001 | Bryning et al. |
| 2001/0041025 A1 | 11/2001 | Farahi |
| 2002/0015563 A1 | 2/2002 | Murakami et al. |
| 2002/0034290 A1 | 3/2002 | Pershan |
| 2002/0090191 A1 | 7/2002 | Sorosiak |
| 2002/0097962 A1 | 7/2002 | Yoshimura et al. |
| 2002/0102088 A1 | 8/2002 | Kondo et al. |
| 2002/0131719 A1 | 9/2002 | Grois et al. |
| 2002/0150372 A1 | 10/2002 | Schray |
| 2002/0174691 A1 | 11/2002 | Arishima et al. |
| 2002/0181893 A1 | 12/2002 | White et al. |
| 2002/0181922 A1 | 12/2002 | Xin et al. |
| 2002/0186954 A1 | 12/2002 | Liu et al. |
| 2003/0002812 A1 | 1/2003 | Lampert |
| 2003/0007767 A1 | 1/2003 | Douglas et al. |
| 2003/0031436 A1 | 2/2003 | Simmons et al. |
| 2003/0031452 A1 | 2/2003 | Simmons et al. |
| 2003/0042040 A1 | 3/2003 | Komiya et al. |
| 2003/0044141 A1 | 3/2003 | Melton et al. |
| 2003/0059526 A1 | 3/2003 | Benson et al. |
| 2003/0072537 A1 | 4/2003 | Eichenberger et al. |
| 2003/0095772 A1 | 5/2003 | Solheid et al. |
| 2003/0128951 A1 | 7/2003 | Lecomte et al. |
| 2003/0138187 A1 | 7/2003 | Kawase et al. |
| 2003/0142949 A1 | 7/2003 | Hicks et al. |
| 2003/0147597 A1 | 8/2003 | Duran |
| 2003/0165315 A1 | 9/2003 | Trebesch et al. |
| 2003/0169570 A1 | 9/2003 | Brebner et al. |
| 2003/0174953 A1 | 9/2003 | Carnevale et al. |
| 2003/0174996 A1 | 9/2003 | Henschel et al. |
| 2003/0180012 A1 | 9/2003 | Deane et al. |
| 2003/0182015 A1 | 9/2003 | Domaille et al. |
| 2003/0198427 A1 | 10/2003 | Bragg et al. |
| 2003/0223724 A1 | 12/2003 | Puetz et al. |
| 2004/0028368 A1 | 2/2004 | Hileman et al. |
| 2004/0033007 A1 | 2/2004 | Ohtsu et al. |
| 2004/0062488 A1 | 4/2004 | Wood |
| 2004/0074852 A1 | 4/2004 | Knudsen et al. |
| 2004/0109660 A1 | 6/2004 | Liberty |
| 2004/0114874 A1 | 6/2004 | Bono et al. |
| 2004/0126069 A1 | 7/2004 | Jong et al. |
| 2004/0136638 A1 | 7/2004 | Baechtle et al. |
| 2004/0161212 A1 | 8/2004 | Sun et al. |
| 2004/0165852 A1 | 8/2004 | Erwin et al. |
| 2004/0172492 A1 | 9/2004 | Faruworth et al. |
| 2004/0175090 A1 | 9/2004 | Vastmans et al. |
| 2004/0179771 A1 | 9/2004 | Verhagen et al. |
| 2004/0213505 A1 | 10/2004 | Saito et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0003697 A1 | 1/2005 | Neer et al. |
| 2005/0018950 A1 | 1/2005 | Arellano |
| 2005/0023656 A1 | 2/2005 | Leedy |
| 2005/0048831 A1 | 3/2005 | Neer et al. |
| 2005/0053337 A1 | 3/2005 | Mayer |
| 2005/0084200 A1 | 4/2005 | Meis et al. |
| 2005/0111801 A1 | 5/2005 | Garman et al. |
| 2005/0123261 A1 | 6/2005 | Bellekens et al. |
| 2005/0129379 A1 | 6/2005 | Reagan et al. |
| 2005/0226566 A1 | 10/2005 | Sasaki et al. |
| 2006/0029353 A1 | 2/2006 | Bolster et al. |
| 2006/0088258 A1 | 4/2006 | Sasaki et al. |
| 2006/0093274 A1 | 5/2006 | Kahle et al. |
| 2006/0093301 A1 | 5/2006 | Zimmel et al. |
| 2006/0098914 A1 | 5/2006 | Tourne |
| 2006/0165366 A1 | 7/2006 | Feustel et al. |
| 2006/0177175 A1 | 8/2006 | Mayer et al. |
| 2006/0210222 A1 | 9/2006 | Watte et al. |
| 2006/0210229 A1 | 9/2006 | Scadden |
| 2006/0228086 A1 | 10/2006 | Holmberg et al. |
| 2006/0245756 A1 | 11/2006 | Kozischek et al. |
| 2006/0257657 A1 | 11/2006 | Curran et al. |
| 2006/0269205 A1 | 11/2006 | Zimmel |
| 2006/0269206 A1 | 11/2006 | Zimmel |
| 2007/0003204 A1 | 1/2007 | Makrides-Saravanos et al. |
| 2007/0025672 A1 | 2/2007 | Suzuki et al. |
| 2007/0025675 A1 | 2/2007 | Kramer |
| 2007/0047893 A1 | 3/2007 | Kramer et al. |
| 2007/0086694 A1 | 4/2007 | Murphy et al. |
| 2007/0189692 A1 | 8/2007 | Zimmel et al. |
| 2007/0206902 A1 | 9/2007 | Blauvelt et al. |
| 2007/0230863 A1 | 10/2007 | Fukuda et al. |
| 2007/0237449 A1 | 10/2007 | Aoki et al. |
| 2007/0239232 A1 | 10/2007 | Kurtz et al. |
| 2008/0008436 A1 | 1/2008 | Reagan et al. |
| 2008/0008437 A1 | 1/2008 | Reagan et al. |
| 2008/0017985 A1 | 1/2008 | Kilger |
| 2008/0019655 A1 | 1/2008 | Vongseng et al. |
| 2008/0025684 A1 | 1/2008 | Vongseng et al. |
| 2008/0089656 A1 | 4/2008 | Wagner et al. |
| 2008/0095501 A1 | 4/2008 | McColloch |
| 2008/0124038 A1 | 5/2008 | Kowalczyk et al. |
| 2008/0131067 A1 | 6/2008 | Ugolini et al. |
| 2008/0145011 A1 | 6/2008 | Register |
| 2008/0175548 A1 | 7/2008 | Knecht et al. |
| 2008/0175550 A1 | 7/2008 | Coburn et al. |
| 2008/0187276 A1 | 8/2008 | Roberts et al. |
| 2008/0273846 A1 | 11/2008 | Register |
| 2008/0298748 A1 | 12/2008 | Cox et al. |
| 2008/0310854 A1 | 12/2008 | Takai et al. |
| 2008/0317425 A1 | 12/2008 | Smith et al. |
| 2009/0041417 A1 | 2/2009 | Rapp et al. |
| 2009/0067800 A1 | 3/2009 | Vazquez et al. |
| 2009/0067802 A1 | 3/2009 | Hoehne et al. |
| 2009/0074372 A1 | 3/2009 | Solheid et al. |
| 2009/0087157 A1 | 4/2009 | Smith et al. |
| 2009/0097797 A1 | 4/2009 | Kewitsch |
| 2009/0097800 A1 | 4/2009 | Gurreri et al. |
| 2009/0097813 A1 | 4/2009 | Hill |
| 2009/0134318 A1 | 5/2009 | Kuniyoshi et al. |
| 2009/0142026 A1 | 6/2009 | Shioda |
| 2009/0180737 A1 | 7/2009 | Burnham et al. |
| 2009/0190896 A1 | 7/2009 | Smith et al. |
| 2009/0196563 A1 | 8/2009 | Mullsteff et al. |
| 2009/0196565 A1 | 8/2009 | Vongseng et al. |
| 2009/0245743 A1 | 10/2009 | Cote et al. |
| 2009/0257726 A1 | 10/2009 | Redmann et al. |
| 2009/0269018 A1 | 10/2009 | Frohlich et al. |
| 2009/0274431 A1 | 11/2009 | Krampotich et al. |
| 2009/0285540 A1 | 11/2009 | Reagan et al. |
| 2009/0290843 A1 | 11/2009 | Reagan et al. |
| 2009/0297111 A1 | 12/2009 | Reagan et al. |
| 2009/0324189 A1 | 12/2009 | Hill et al. |
| 2010/0158465 A1 | 1/2010 | Smrha |
| 2010/0054683 A1 | 3/2010 | Cooke et al. |
| 2010/0086260 A1 | 4/2010 | Parikh et al. |
| 2010/0124421 A1 | 5/2010 | Chand et al. |
| 2010/0129028 A1 | 5/2010 | Nhep et al. |
| 2010/0142910 A1 | 6/2010 | Hill et al. |
| 2010/0166370 A1 | 7/2010 | Cody et al. |
| 2010/0195955 A1 | 8/2010 | Burnham et al. |

(56) References Cited

U.S. PATENT DOCUMENTS

| | | |
|---|---|---|
| 2010/0238428 A1 | 9/2010 | Glines et al. |
| 2010/0296790 A1 | 11/2010 | Cooke et al. |
| 2010/0298895 A1 | 11/2010 | Ghaffari et al. |
| 2010/0316334 A1 | 12/2010 | Kewitsch |
| 2010/0316335 A1 | 12/2010 | Furuyama |
| 2010/0322562 A1 | 12/2010 | Barnes et al. |
| 2010/0322576 A1 | 12/2010 | Rhoney et al. |
| 2010/0322577 A1 | 12/2010 | Bolster et al. |
| 2010/0322579 A1 | 12/2010 | Cooke et al. |
| 2010/0329620 A1 | 12/2010 | Griffiths et al. |
| 2011/0002586 A1 | 1/2011 | Nhep |
| 2011/0019964 A1 | 1/2011 | Nhep et al. |
| 2011/0034912 A1 | 2/2011 | de Graff et al. |
| 2011/0044599 A1 | 2/2011 | Kowalczyk et al. |
| 2011/0065909 A1 | 3/2011 | Lange et al. |
| 2011/0081114 A1 | 4/2011 | Togami et al. |
| 2011/0085764 A1 | 4/2011 | Grueb et al. |
| 2011/0085771 A1 | 4/2011 | Matsuyama et al. |
| 2011/0096404 A1 | 4/2011 | Kadar-Kallen |
| 2011/0103748 A1 | 5/2011 | Ott |
| 2011/0103803 A1 | 5/2011 | Kolesar |
| 2011/0110673 A1 | 5/2011 | Elberbaum |
| 2011/0182558 A1 | 7/2011 | Garcia et al. |
| 2011/0217016 A1 | 9/2011 | Mullsteff |
| 2011/0222823 A1 | 9/2011 | Pitwon |
| 2011/0222829 A1 | 9/2011 | Loeffelholz et al. |
| 2011/0262077 A1 | 10/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0268414 A1 | 11/2011 | Giraud et al. |
| 2011/0274400 A1 | 11/2011 | Mudd et al. |
| 2011/0317973 A1 | 12/2011 | Rapp et al. |
| 2012/0002934 A1 | 1/2012 | Kimbrell et al. |
| 2012/0008900 A1 | 1/2012 | Schneider |
| 2012/0014645 A1 | 1/2012 | Kadar-Kallen |
| 2012/0020618 A1 | 1/2012 | Erdman et al. |
| 2012/0020619 A1 | 1/2012 | Kadar-Kallen et al. |
| 2012/0051706 A1 | 3/2012 | Van Geffen et al. |
| 2012/0051708 A1 | 3/2012 | Badar et al. |
| 2012/0057838 A1 | 3/2012 | Hill et al. |
| 2012/0148198 A1 | 6/2012 | Togami et al. |
| 2012/0189259 A1 | 7/2012 | Manes |
| 2012/0213469 A1 | 8/2012 | Jia et al. |
| 2012/0263415 A1 | 10/2012 | Tan et al. |
| 2012/0276549 A1 | 11/2012 | Cunningham et al. |
| 2012/0288233 A1 | 11/2012 | Barnes et al. |
| 2012/0301098 A1 | 11/2012 | Benedetto et al. |
| 2012/0309080 A1 | 12/2012 | Cunningham et al. |
| 2013/0014936 A1 | 1/2013 | Griffith |
| 2013/0039616 A1 | 2/2013 | Shambat et al. |
| 2013/0064495 A1 | 3/2013 | Eberle, Jr. |
| 2013/0064506 A1 | 3/2013 | Eberle, Jr. et al. |
| 2013/0077913 A1 | 3/2013 | Schneider et al. |
| 2013/0089292 A1 | 4/2013 | Ott et al. |
| 2013/0148926 A1 | 6/2013 | Koshinz et al. |
| 2013/0148936 A1 | 6/2013 | Hill |
| 2013/0170797 A1 | 7/2013 | Ott |
| 2013/0287356 A1 | 10/2013 | Solheid et al. |
| 2013/0343700 A1 | 12/2013 | Kolesar |
| 2014/0086545 A1 | 3/2014 | Solheid et al. |
| 2014/0133810 A1 | 5/2014 | Schneider |
| 2014/0205244 A1 | 7/2014 | Bradley |
| 2014/0212095 A1 | 7/2014 | Isenhour et al. |
| 2014/0270636 A1 | 9/2014 | Manes |
| 2014/0303452 A1 | 10/2014 | Ghaffari |
| 2015/0253514 A1 | 9/2015 | Murray et al. |
| 2015/0260927 A1 | 9/2015 | Murray et al. |
| 2016/0259141 A1 | 9/2016 | Schneider et al. |
| 2017/0153399 A1 | 6/2017 | Rodriguez |
| 2019/0025521 A1 | 1/2019 | Geens et al. |
| 2020/0249412 A1 | 8/2020 | Marcouiller et al. |
| 2020/0348471 A1 | 11/2020 | Murray et al. |
| 2020/0386949 A1 | 12/2020 | Eberle, Jr. |
| 2021/0011228 A1 | 1/2021 | Murray et al. |
| 2021/0072463 A1 | 3/2021 | Zitsch et al. |
| 2021/0263252 A1 | 8/2021 | Schneider et al. |
| 2021/0302669 A1 | 9/2021 | Murray et al. |

FOREIGN PATENT DOCUMENTS

| | | |
|---|---|---|
| CN | 1248329 A | 1/1998 |
| CN | 2426610 Y | 4/2001 |
| CN | 1277137 C | 9/2006 |
| CN | 102057306 | 5/2011 |
| CN | 102272650 | 12/2011 |
| CN | 104823091 A | 8/2015 |
| DE | 27 35 106 A1 | 2/1979 |
| DE | 33 08 682 A1 | 9/1984 |
| DE | 42 07 531 A1 | 9/1992 |
| DE | 42 29 510 A1 | 3/1994 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 293 183 A2 | 11/1988 |
| EP | 0 349 290 A1 | 1/1990 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| EP | 0 585 809 A1 | 3/1994 |
| EP | 0587336 | 3/1994 |
| EP | 0 697 610 A1 | 2/1996 |
| EP | 0 743 701 A1 | 11/1996 |
| EP | 0 788 002 A1 | 8/1997 |
| EP | 0 871 047 A1 | 10/1998 |
| EP | 563995 | 10/1999 |
| EP | 0 975 180 A1 | 1/2000 |
| EP | 1 045 267 A1 | 10/2000 |
| EP | 1102095 | 5/2001 |
| EP | 1103832 | 5/2001 |
| EP | 1067418 | 10/2001 |
| EP | 1 162 487 A2 | 12/2001 |
| EP | 1 884 809 A1 | 2/2008 |
| FR | 2 531 576 A1 | 2/1984 |
| FR | 2 587 127 A1 | 3/1987 |
| GB | 2 239 104 A | 6/1991 |
| GB | 2367902 | 10/2000 |
| JP | 59-74523 A | 4/1984 |
| JP | 60-169811 A | 9/1985 |
| JP | 61-53076 A | 3/1986 |
| JP | 61-55607 A | 3/1986 |
| JP | 61-90104 A | 5/1986 |
| JP | 63-229409 A | 9/1988 |
| JP | H06-186438 | 7/1994 |
| JP | H07-209526 | 8/1995 |
| JP | H07281052 | 10/1995 |
| JP | H08-286081 | 11/1996 |
| JP | H09-90171 | 4/1997 |
| JP | H10-10368 | 1/1998 |
| JP | H1068853 | 3/1998 |
| JP | H10339818 | 12/1998 |
| JP | 2001255421 | 9/2001 |
| JP | 2002-174736 A | 6/2002 |
| JP | 1144266 S | 6/2002 |
| JP | 3307618 B2 | 7/2002 |
| JP | 2002-254306 | 9/2002 |
| JP | 2002253341 | 9/2002 |
| JP | 2002-311252 A | 10/2002 |
| JP | 2005-257887 A | 9/2005 |
| JP | 3761762 B2 | 3/2006 |
| JP | 2007318741 | 12/2007 |
| JP | 2010-019895 | 1/2010 |
| JP | 2010239535 | 10/2010 |
| JP | 2011-191333 A | 9/2011 |
| KR | 10-2005-0034103 | 4/2005 |
| WO | 9009708 | 8/1990 |
| WO | WO 91/10927 A1 | 7/1991 |
| WO | 94/17534 | 8/1994 |
| WO | WO 95/20175 A1 | 7/1995 |
| WO | WO 98/36309 A1 | 8/1998 |
| WO | WO 98/53347 A2 | 11/1998 |

(56) References Cited

FOREIGN PATENT DOCUMENTS

| WO | 9913367 | 3/1999 |
|---|---|---|
| WO | WO 99/27404 A1 | 6/1999 |
| WO | 9946621 | 9/1999 |
| WO | WO 00/05611 A2 | 2/2000 |
| WO | WO 00/07053 A2 | 2/2000 |
| WO | WO 00/52504 A2 | 9/2000 |
| WO | WO 03/093883 A2 | 11/2000 |
| WO | WO 00/75706 A2 | 12/2000 |
| WO | 2001061317 | 8/2001 |
| WO | WO 01/75495 A2 | 10/2001 |
| WO | WO 02/21182 A1 | 3/2002 |
| WO | WO 02/103429 A2 | 12/2002 |
| WO | 2003021312 | 3/2003 |
| WO | 2008027201 | 3/2008 |
| WO | WO 2008/089192 A1 | 7/2008 |
| WO | WO 2009/120280 A2 | 10/2009 |
| WO | 2011094327 | 8/2011 |
| WO | 2011100613 | 8/2011 |
| WO | 2013106820 | 7/2013 |
| WO | WO 2017/121778 A1 | 7/2017 |

OTHER PUBLICATIONS

U.S. Appl. No. 62/027,657, filed Jul. 22, 2014 entitled "Door Hinge Mechanism for Telecommunications Panel."
U.S. Appl. No. 61/707,323, filed Sep. 28, 2012 entitled "Fiber Optic Cassette."
International Search Report for International Application No. PCT/US2013/061662 dated Jan. 22, 2014 (2 pages).
International Written Opinion for International Application No. PCT/US2013/061662 dated Jan. 22, 2014 (13 pages).
European Search Report for Application No. 13842179.7 dated Apr. 6, 2016.
International Standard, "Fiber optic connector interfaces—Part 4-1: Type SC connector family—Simplified receptacle SC-PC connector interfaces," Copyright IEC 61754-4-1, First edition, Jan. 2003 (9 pages).
Bokstaele, et al., "A scalable parallel optical interconnect family," IO Overview Paper, Apr. 2004 (10 pages).
Grimes, "Applications of Parallel Optical Interconnects," Lasers and Electro-Optics Society Annual Meeting, Nov. 18-21, 1996, pp. 6-7, vol. 2 (2 pages).
Schneider et al., "Fibre Optic Circuits," TechCon 2011 (10 pages).
Shahid et al., "Flexible High Density Optical Circuits," National Fiberoptic Engineers Conference, 2001 Technical Proceedings (8 pages).
International Search Report for International Application No. PCT/US2013/061670 dated Jan. 14, 2014 (2 pages).
International Written Opinion for International Application No. PCT/US2013/061670 dated Jan. 14, 2014 (13 pages).
Partial Supplementary European Search Report for Application No. 12831456.4 dated Nov. 13, 2019.
Extended European Search Report for Application No. 12831456.4 dated Feb. 25, 2020.
"ADC OMX 600 Optical Distribution Frame Solution," ADC Telecommunications, Inc., Publication No. 856, 8 pgs. (Feb. 2000).
ADC Telecommunications brochure entitled "Fiber Cable Management Products, Second Edition," 144 pages, dated Oct. 1995.
ADC Telecommunications, Inc. brochure entitled "FL2000 Products," Publication No. 803, 51 pages (Nov. 1996).
ADC Telecommunications brochure entitled "Next Generation Frame (NGF) Product Family Ordering Guide," 22 pages, dated Oct. 1998.
ADC Telecommunications, Inc., brochure entitled "Value-Added Module (VAM) System: Monitor, Splitter, WDM and CWDM Modules and Chassis for Switching Office, Central Exchange and Headend Applications, 1st edition," Part No. 101663BE, 36 pages (Feb. 2008).
ADC Telecommunications, Inc., "Value-Added Module (VAM) System—Monitor, Splitter, WDM/CWDM/DWDM Modules and Chassis—5th Edition," Oct. 2009, 32 Pages.

ADC Telecommunications, Inc., 600 mm Products, Value-Added Module System, pp. 53-78 (Oct. 2003).
ADC Telecommunications, Inc., brochure entitled "Value-Added Module System," Publication No. 891, 29 pages (Apr. 2000).
ADC Telecommunications, Inc., brochure entitled "ValueAdded Module System: Optical Distribution Frame (OMX™ 600)," Publication No. 891-OMX, 11 pages (Jan. 2002).
ADC Telecommunications, Inc., brochure entitled "Fiber Management Tray: 2 Rack Unit (2 RU) Style FMT-G Series," Publication No. 1258896, 8 pages (Mar. 2003).
ADC Telecommunications, Inc., FMT Micro Value Added Monitor Module Configuration Scheme, pp. 1-2 (Feb. 6, 2003).
ADC Telecommunications, Inc., Mini VAM Connector Cleaning Instructions, ADCP-90-412, Issue 3, pp. 1-8 (Sep. 2002).
ADC Telecommunications, Inc., Mini VAM Splitter Mod (Installation Drawing), Drawing No. 1128185, 2 pages (Mar. 14, 2001).
ADC Telecommunications, Inc., Next Generation Frame (NGF) Product Tour, Value Added Modules (VAMs), Copyright 2003, 1 page, (admitted as offered for sale as of Apr. 25, 2006).
ADC Telecommunications, Inc., brochure entitled "Fiber Panel Products, Second Edition," front cover, Table of Contents, and pp. 1-111, Publication No. 846 (Jul. 1996) (116 pages total).
ADC Telecommunications, Inc.'s 6th Edition of Next Generation Frame (NGF) Product Family Ordering Guide; front cover, Table of Contents, pp. 1-41, and back cover; Item No. 820 (revised Feb. 2003) (44 pages total).
ADC Telecommunications, Inc.'s Fiber Optic, Cable Assemblies and Accessories Brochure; front cover, Table of Contents, pp. 1-23, and back cover; Item No. 100300 (revised Apr. 2003).
ADC Telecommunications, Inc., Next Generation Frame (NGF) Product Family, Publication No. 832, 8 pages, (Dec. 2000).
ADC Telecommunications, Inc., brochure entitled "Secure Fiber Entrance Terminal (SFET)," front cover, pp. 2-7, and back cover, Item No. 1005 (revised May 1998) (8 pages total).
ADC Telecommunications, Inc., brochure entitled "Outside Plant, Fiber Cross-Connect Solutions," front cover, Table of Contents, pp. 1-48, and back cover, Item No. 1047 (Jun. 2002).
Alcoa Fujikura Ltd., brochure entitled "Couplers: Couplers WDMS Packaging,", 5 pages (copyright 2000).
AMP Inc. catalog entitled "Fiber Optic Products," front and back covers and p. 59, (4 pgs.) (© 1991).
Assembly reference drawings having drawing No. 1067101, dated Aug. 17, 1999 (8 pages).
AT&T Network Systems catalog entitled "Fiber Optic Products Innovation for wide ranging applications," front and back covers and pp. 6-1 through 6-16 (18 pages total) (© 1995).
AT&T Network Systems, Product Bulletin, "High Density Interconnect System (HDIC)," 2987D-DLH-7/89, Issue 2, 4 pages (Copyright 1989).
ATI Optique Catalog, ATI Optique Division of Ti electronique, Version 2.6, released Mar. 27, 2002 (50 pages).
Amphenol Corp., brochure entitled "Amphenol® 954 Series one piece SC Connector," F122-00311, Issue 1, 2 pages (Aug. 1990).
21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.
24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).
Connectorized splitter drawings having drawing No. 1067961, dated Aug. 18, 1999 (2 pages).
Corning Cable Systems, "Installation Instructions for 12-position Splice Protector Insert," SRP-001-276, Issue 4, 1 page (Jul. 2001).
Corning Cable Systems, "Jumper Routing Procedure for Enhanced Management Frame," SRP-003-599, Issue 2, 4 pages (Apr. 2002).
Fiber distribution drawings having drawing No. 1069967, dated Aug. 17, 1999 (2 pages).
FONS Corporation, MDC Series Rack or Wall Mount Enclosures product sheet, 3 pages (2002).
FONS Corporation, Modular Distribution Cabinets Rack Mount Enclosures, Model MDC-7, product sheet, 2 pages (2005).

(56) References Cited

OTHER PUBLICATIONS

FONS Corporation's Technical Drawing No. 11669, Rev. D, of Distribution Cabinet Assembly MFDC-7, 1 page (technical drawing depicting the device shown in Exhibit M).
Hasegawa et al., "100GHz-48CH Athermal AWG with a Novel Temperature Insensitive Principle," National Fiber Optics Engineers Conference, 2003 Technical Proceedings, pp. 801-808.
"High-density FlexPlane™ Optical Circuitry provides high-density optical routing on PCBs or backplanes", Molex, 3 pages (2012).
Hirose Electric Co., Ltd., catalog entitled "Optical Fibre Connectors," Catalog No. O.F. (9) 3K, front and back covers and pp. 16, 17 and 49 (Mar. 1991) (5 pages total).
Installation drawings having drawing No. 1069965, dated Aug. 14, 1999 (3 pages).
Iwano, S. et al., "MU-type Optical Fiber Connector System," NTT Review, vol. 9, No. 2, pp. 63-71 (Mar. 1997).
Nexans, "Cross-Connect Cabinet Iii: Plastic Watertight Cabinet for FTTH Applications," 2 pages (Oct. 2002).
Nexans, "Cross-Connect Cabinet V: Metallic Watertight Cabinet for FTTH Applications," 2 pages (Oct. 2002).
Northern Telecom Bulletin #91-004, Issue #2, 16 pages (May 1991).
NTT International, brochure entitled "Fiber Termination Module (FTM) & Premises Optical Distribution Cabinets (PODC)," 3 pages, undated.
"OMX™ 600 Optical Distribution Frame," ADC Telecommunications, Inc., Publication No. 854, front cover, table of contents, pp. 1-13, rear cover (Apr. 2000).
"Optical fiber coupler review," Manufacturing Group at the Optoelectronics Division, Technical Report 2001, Products Presentation, showing Sumitomo Osaka Cement Co. Ltd's Optical Coupler (pp. 41-42).
Precision Mechanical, in Chinese with English Translation, 5 pages (publicly known at least as early as Aug. 2002).
Preface to the book "Structure, Installation, Connection and Protection of Communication Optical Fiber Cable," in Chinese with English Translation, 14 pages (Mar. 1992).
Shahid, M.A. et al., "Flexible Optical Backplane Interconnections," Proceedings of MPPOI'96, pp. 178-185 (1996).
Sugita et al., "SC-Type Single-Mode Optical Fiber Connectors," Journal of Lightwave Technology, vol. 7, No. 11, pp. 1689-1696 (Nov. 1989).
Tachikura et al., Newly Developed Optical Fiber Distribution System and Cable Management in Central Office, International Wire & Cable Symposium, Proceedings of the 50th IWCS, pp. 98-105.
U.S. Appl. No. 61/538,737, filed Sep. 23, 2011, entitled "Flexible Optical Circuit" (13 pages).

* cited by examiner

FLEXIBLE LENSED OPTICAL INTERCONNECT DEVICE FOR SIGNAL DISTRIBUTION

CROSS-REFERENCE TO RELATED APPLICATIONS

The present application is a continuation of U.S. application Ser. No. 16/653,253, filed Oct. 15, 2019, now U.S. Pat. No. 10,782,483; which is a continuation of U.S. application Ser. No. 16/027,946, filed Jul. 5, 2018, now U.S. Pat. No. 10,451,809; which is a continuation of U.S. application Ser. No. 15/236,054, filed Aug. 12, 2016, now U.S. Pat. No. 10,031,295; which is a continuation of U.S. application Ser. No. 13/230,094, filed on Sep. 12, 2011, now U.S. Pat. No. 9,417,418, the disclosures of which are hereby incorporated it their entireties.

FIELD OF THE INVENTION

The invention pertains to fiber optic connectivity for high speed signal distribution.

BACKGROUND OF THE INVENTION

Fiber optic breakout cassettes are passive, optical components that connect fibers between sets of cables. Such cassettes usually provided transition between multi-fibered connectors, such as MPO type connectors with MT ferrules, and single or dual fiber connectors, such as LC or SC type connectors. A typical fiber optic breakout cassette of the prior art is illustrated in FIG. 1. The function of this particular exemplary cassette 100 is to distribute the signals between the twelve fibers contained in fiber optic cable 103 and six dual-fiber cables 105. For instance, in a practical case, each dual-fiber cable 105 comprises one transmit channel and one receive channel. Hence, six of the fibers in the twelve-fiber cable 103 transmit data into and through the cassette to one of the fibers in each of the six dual-fiber cables 105. The other six fibers in the twelve-fiber cable 103 receive data through the cassette from the other one of the fibers in each of the six dual-fiber cables 105. Thus, multi-fiber cable 103 is terminated with a multi-fiber connector, such as an MPO plug connector 107. The six dual fiber cables 105 are each terminated with a dual fiber connector, such as dual fiber LC plug connectors 109. Alternately, each cable 105 could be terminated with two signal-fiber connectors. The cassette 100 comprises adapter 114 in an aperture in the wall of the housing 101 to which a twelve-fiber MPO-style receptacle connector 111 is attached on the inside of the housing for mating with the twelve-fiber MPO-style plug connector 107 at the end of cable 103. The cassette 100 further comprises six dual adapters 115 in apertures in the wall of the housing 101 to which twelve single-fiber LC-style receptacle connectors 113 are attached on the inside of the housing 101 for optically connecting to the six dual-fiber LC-style plug connectors 109 at the ends of fiber optic cables 105. Twelve individual fibers 117 are routed within the housing 101 between the back of the MPO receptacle connector 111 and the backs of the twelve LC receptacle connectors 113.

These optical cassettes 100 are rather expensive because they usually are assembled by hand by highly skilled workers and require connection of the fibers 117 to the connectors 111 and 113 at both ends of each fiber, which includes placing the fibers 117 into the ferrules of connectors 111, 113, epoxying the fibers in the connectors, polishing the end faces of the fibers, routing the fibers 117 within the tight space of the housing 101, and all the other steps normally associated with optical fiber terminations to connectors. Further, because the cassettes are hand-assembled, they are subject to human error and variability depending on operator skill and experience, especially with respect to improper fiber routing. In addition, assembly of a fiber optic cassette involves time-consuming, in-process testing, especially for higher speed components.

Even further, with the increasing prevalence of 40 GB and 100 GB per second optical networks, the breakout/consolidation in a fiber optic cassette involves multi-fiber connectors on both ends of the fibers since, in 40 GB and 100 GB networks, each channel now includes 4, 8, 10, or 20 fibers in parallel, rather than 2. With the channels now needing many more fibers, consolidation of these channels into larger fiber count trunks will be critical in the future as space inside data centers becomes more costly. As a consequence, the associated fiber routing inside the cassette becomes much more complex and prone to operator variability.

Power requirements for optical channels will be strict and space constraints will be significant. Hence, performance will need to be tightly controlled, such that tolerances will become increasingly strict and operator variability will become more and more problematic. This will lead to more costly, higher precision components, higher in-process testing costs, and increased levels of manufacturing rework and scrap.

SUMMARY OF THE INVENTION

The invention relates to a method and device for interconnecting optical components, such as optical fibers, optical connectors, and optical circuits, in a flexible, repeatable, and cost-effective manner. The invention can be implemented in optical cassettes, patch panels, patch panel enclosures, zone distribution hardware, wall fixtures, and the like. It may be used to replace breakout cables in data centers and the like. It may be applied in virtually any optical interconnectivity application. In accordance with the invention, two or more optical components are optically interconnected by a flexible optical circuit substrate bearing one or more embedded optical fibers with a lens at each end of each fiber. The lens may be embedded in the flexible optical circuit substrate or disposed in a separate supporting device either mounted on or apart from the substrate. The flexible optical circuit may be incorporated into a housing bearing apertures for receiving the optical connectors of the optical components that are to be interconnected with the device, such as the optical connectors at the ends of optical cables or at the interfaces of optical or electro-optical circuits. The cleaved ends of the fibers embedded in the flexible optical circuit or in a subsidiary device are positioned adjacent to lenses which allow optical coupling to the apertures for optically connecting to the fibers within the connectors installed in the apertures without the need for mating connectors inside of the housing. Alternately, fibers may be shaped such that they act as lenses to couple directly to a focusing device such as a lens to optically couple to the connectors mounted in the apertures.

DETAILED DESCRIPTION

Figure 1:
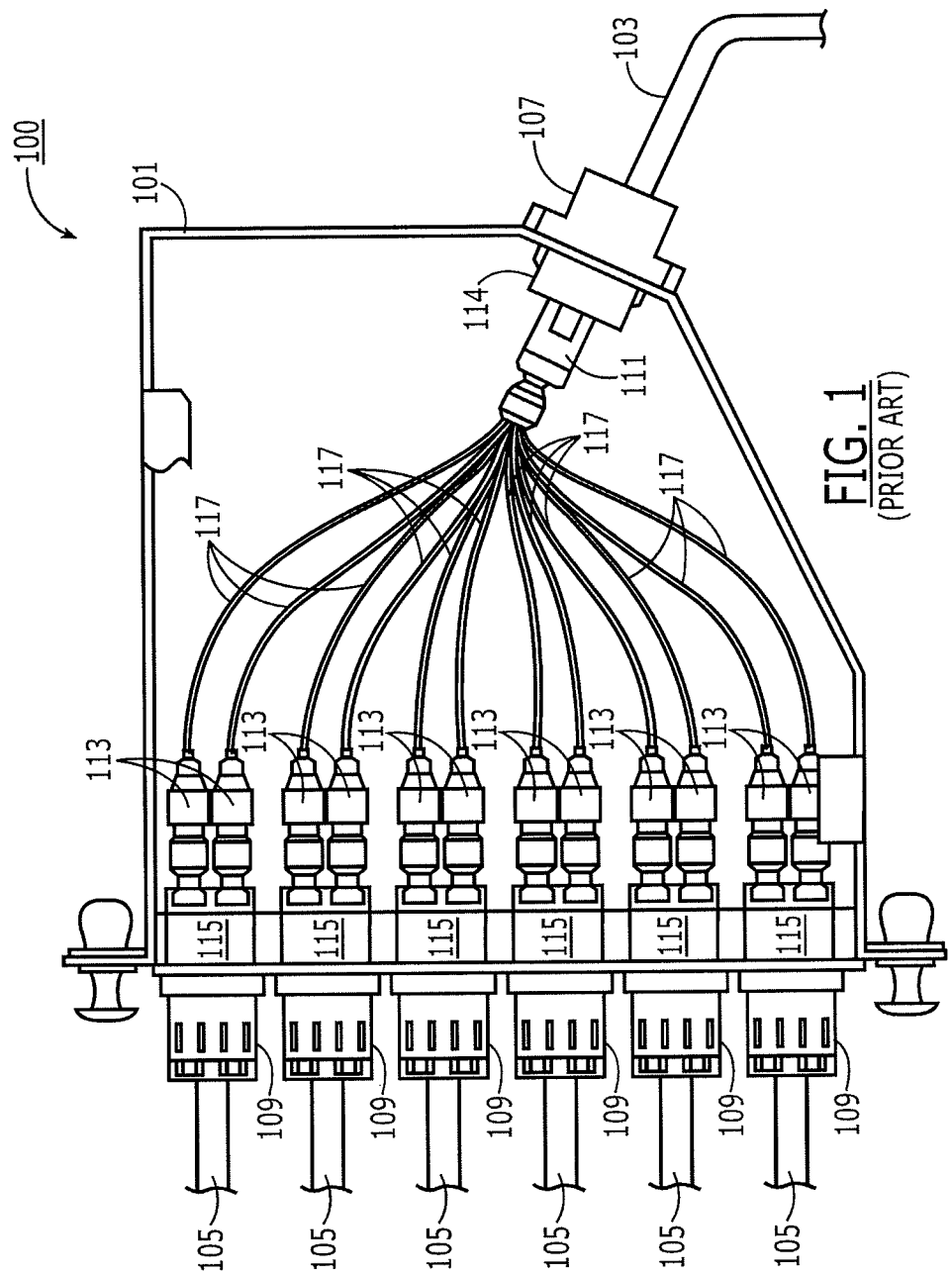
FIG. 1 is a top view of an exemplary fiber optic cassette of the prior art with the top panel removed.

The present invention relates to a method and apparatus for interconnecting first and second optical components, such as optical cables or electro-optical devices in a cost-effective, flexible, and repeatable manner. The invention is particularly suitable in such applications as optical cassettes, patch cables, optical splitters, patch panel interconnectors, zone distribution hardware, wall fixtures, and the like.

The present invention involves the use of flexible optical circuits bearing at least one, but, more effectively, many optical fibers embedded in a flexible optical circuit substrate with a molded lens disposed on at least one end face of the one or more fibers. The lenses can be optically interfaced with external standard optical connectors (e.g., MPO, LC, ST, SC plugs) at the ends of cables or at the interfaces of electro-optical devices without the need for a conventional mating connector (e.g., MPO, LC, ST, SC receptacles). Rather, a connector on an optical component, e.g., an LC plug at the end of a fiber optic cable, can be plugged into an adapter on a panel of an optical cassette to optically couple directly with the lens at the end of the embedded optical fiber, such as an LC receptacle connector, inside of the cassette enclosure. The elimination of conventional connectors inside the cassette significantly reduces the overall costs because it eliminates the highly skilled labor normally associated with terminating an optical fiber to a connector, including polishing and epoxying the fiber into the connector, as well as the labor and craft dependencies associated with routing optical fibers inside a cassette. It further allows the cassette to be made very thin. Further, the flexible optical circuit in accordance with the present invention need not be placed in a rigid housing or any housing at all, depending on the particular application.

Since the lensed flexible optical circuit is mechanically flexible, the concept of the present invention can be used in many different applications, of which an optical cassette is merely one example. For instance, it can be placed in an L-shaped housing and used to make right angle connections, such as a right angle optical wall adapter. It may be wound into a cylinder and used to make interconnections in existing conduit. The lensed flexible optical circuit connectivity concept can be incorporated into flexible housings, such as housings made of rubber so that a single cassette can be used to make connections in different environments and/or can compensate in all six degrees of freedom (e.g., X, Y, and Z axes and roll, pitch, and yaw) to compensate for any form of misalignment of two components that are to be optically interconnected. Due to the flexible nature of the flexible optical circuit substrate, the invention can accommodate virtually any physical environment in which the interconnection fibers are not coplanar. As just noted, the flexible optical circuit can be bent into any non-planar shape, including, but not limited to, a cylinder, an S curve, a right angle curve, a compound curve, and corrugations.

The invention further can be incorporated into housings having two parts interconnected by a hinge so that they are bendable about the axis of the hinge to provide similar flexibility.

It is envisioned that a finite number of flexible optical circuits in accordance with the present invention combined with a finite number of modularly connectable housing components, particularly flexible, bendable, stretchable, and/or hingedly connectable housing components, and one or more different lens blocks can offer the ability to modularly construct an optical interconnect for virtually any situation from a relatively small number of pieces. Such a modular system would substantially reduce costs and substantially increase quality and repeatability by substantially reducing or eliminating the human labor involved in fabricating such optical interconnection circuits.

Figure 2:
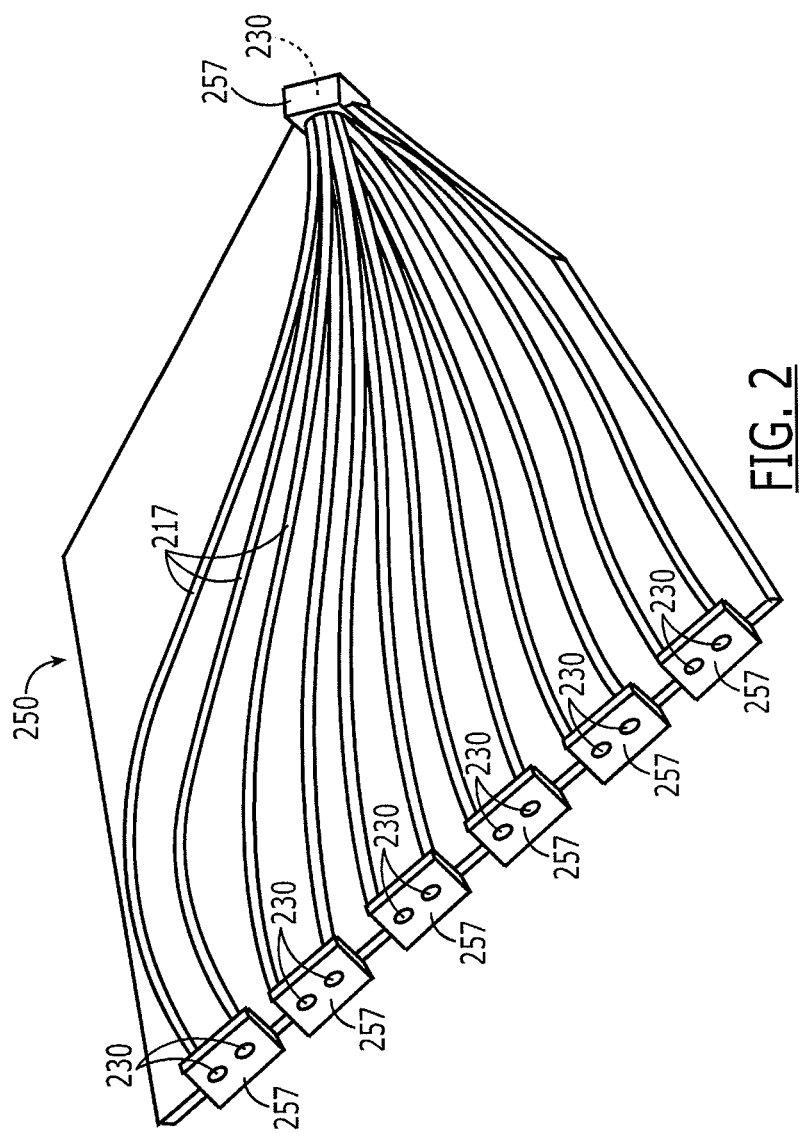
FIG. 2 is a depiction of a flexible fiber optical circuit in accordance with the principles of the present invention.

FIG. 2 shows a flexible optical circuit 250 in accordance with the principles of the present invention. This particular flexible optical circuit achieves the same signal routing as the cassette in FIG. 1. Particularly, an optical fiber cable, such as cable 103 in FIG. 1 on the right side containing twelve fibers that need to be routed, one each to the twelve single optical connectors, such as connectors 113 in FIG. 1 on the left. Thus, the flexible optical circuit 250 includes twelve optical fibers 217 routed accordingly. All of the embedded fibers 217 are terminated at each end with a molded lens 230. The lenses 230 are disposed in a lens block 257, which can be mounted in a separate holder (not shown in FIG. 2) as discussed in more detail below in connection with FIG. 4.

Flexible optical circuits are known and, hence, will not be described in detail. However, they essentially comprise one or more fibers 217 sandwiched between two or more flexible sheets of material 226, 228, such as Mylar™ or another polymer. An adhesive 255 may be included between two sheets in order to make them adhere to each other. Alternately, depending on the sheet material and other factors, the two sheets 226, 228 may be heated above their melting point to heat weld them together with the fibers embedded between the two sheets.

Considerable technology has been developed relating to the design, fabrication, and use of such lenses in optical connectors, which technology can be used to design and fabricate such lenses 230, terminate the optical fibers 217 with such lenses, and couple light through such lenses to fibers in optical connectors. Such information can be obtained from the following patents and patent applications, all of which are incorporated herein fully by reference.

U.S. Pat. No. 7,722,261 entitled Expanded Beam Connector;

U.S. Pat. No. 8,085,472 entitled Expanded Beam Interface Device and Method of Fabricating Same;

U.S. Pat. No. 8,313,249 entitled Multi-Fiber Ferrules for Making Physical Contact and Method of Determining Same;

U.S. Pat. No. 6,208,779 entitled Optical Fiber Array Interconnection;

U.S. Pat. No. 6,480,661 entitled Optical ADD/DROP Filter and Method of

Making Same;

U.S. Pat. No. 6,690,862 entitled Optical Fiber Circuit;

U.S. Pat. No. 6,012,852 entitled Expanded Beam Fiber Optic Connector; and

U.S. Patent Publication No. 2012/0014645 entitled Single-Lens, Multi-Fiber Optical Connector Method and Apparatus.

More specifically, technology is available to couple a connector directly in front of the lens 230 so that the lens does not need to have its own conventional mating connector, such as disclosed in aforementioned U.S. Pat. No. 7,722,261. Rather, with reference to FIG. 3, which shows the flexible optical circuit 250 of FIG. 2 incorporated into an optical cassette 200 like that of FIG. 1, cables 103, 105 (or other optical components that are to be optically interconnected) can be terminated with conventional connectors 107, 109, as in FIG. 1. These connectors 107, 109 may be plugged into adapters 115 on the cassette 200 adjacent the respective lenses 230 and optically couple with the lenses (and, through the lenses, with the fibers 217 of the flexible optically circuit) without the need for a conventional second, mating connector on the inside of the cassette housing 201.

With respect to the multiple fiber connector 107, each fiber may optically couple to an individual lens. However, alternately, a single large lens 230 can be used to couple the light from each of the twelve fibers in connector 107 individually into the twelve fibers 217 on the flexible optical circuit 250. For instance, see U.S. Patent Publication No. 2012/0014645.

The use of the lensed flexible optical circuit 250 disclosed herein, therefore, eliminates most, if not all, of the skilled manual labor normally associated with fabricating an optical cassette. Particularly, polishing the end faces of the fibers. Furthermore, there is no need to manually route optical fibers inside the cassette housing, which can be quite difficult when the number of optical couplings that need to be made is large. Flexible optical circuits, on the other hand, are generally fabricated on substantially automated machines and thus can be mass produced quickly and inexpensively and then just inserted into a housing.

The invention also eliminates many of the components employed in conventional internal connection and simplifies the connector process. This feature further reduces costs significantly as well as allows the housing to be very thin and/or flexible.

Figure 3:
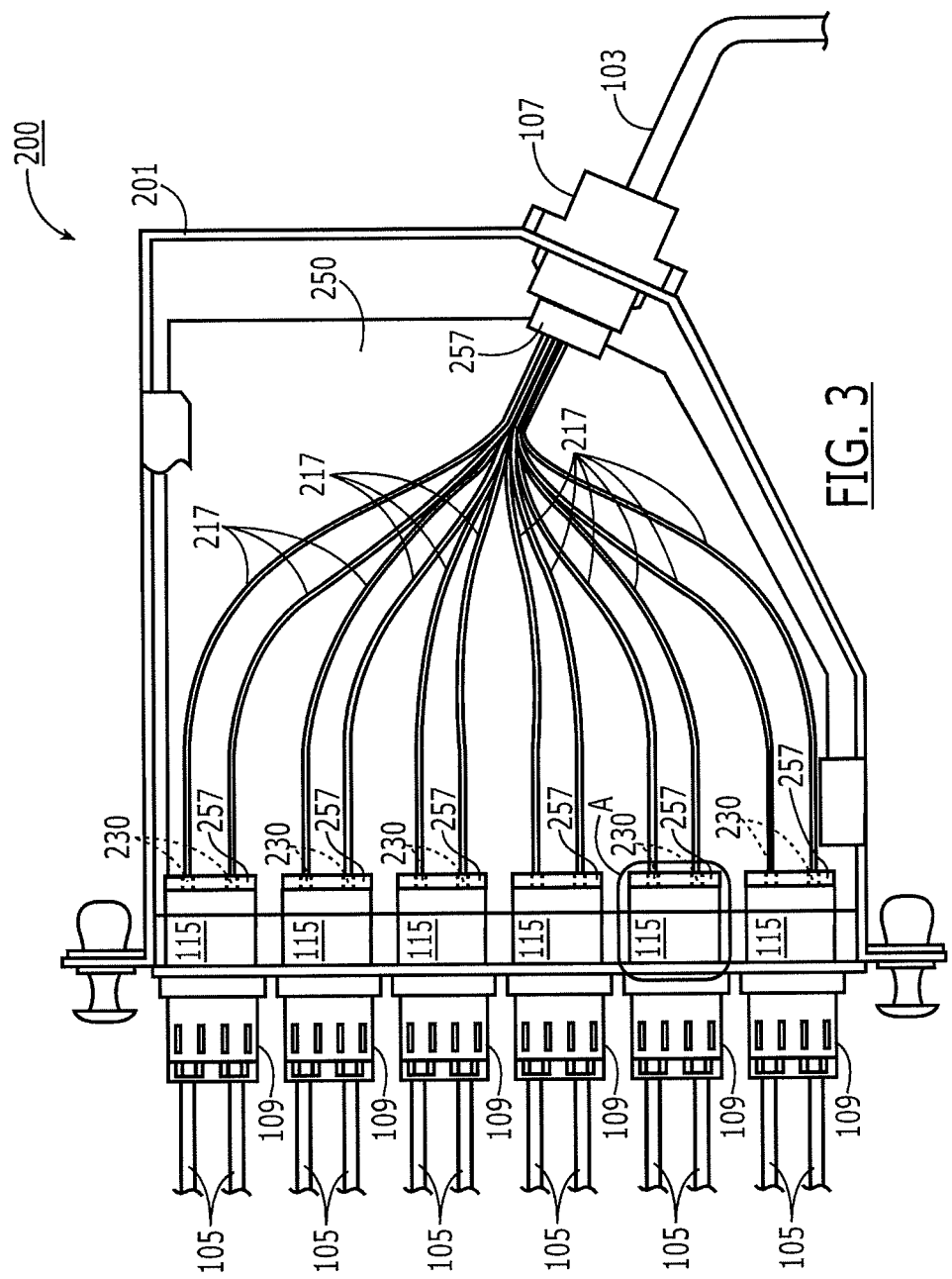
FIG. 3 is a plan view of a fiber optic cassette in accordance with the principles of the present invention with the top panel removed.
Figure 4:
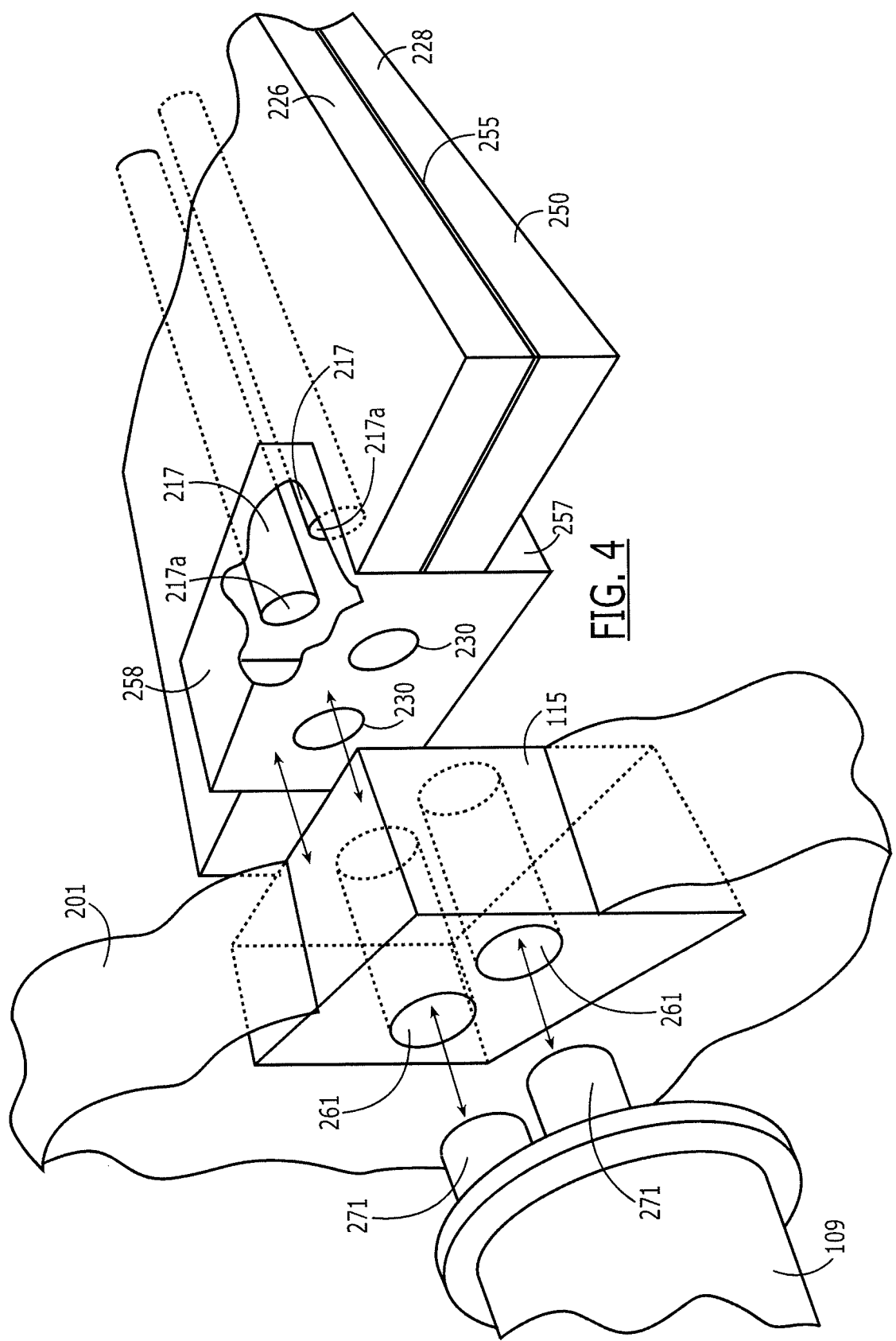
FIG. 4 is a detailed view of portion A of FIG. 3.

FIG. 4 is a detailed exploded view of portion A of FIG. 3 illustrating the interface of two fibers 217 in the flexible optical circuit 250 to two fibers 271 in an exemplary two fiber external connector 109. Particularly, the external connector 109, which may be any conventional connector, such as an SC, LC, ST, or MPO connector, is inserted into an adapter 115 in an aperture in cassette housing 201 essentially in a conventional manner. On the internal side of housing 201, the flexible optical circuit 250 contains fibers 217, the end faces 217a of which are terminated to a lens block 257 comprising two lenses 230 molded as part of a polymer block 258. Alternatively, the lenses can be fabricated separately and placed in openings in a supporting block, such as a polymer block. An index-matching material (not shown), such as a gel or adhesive, may be placed in the interstices between the end faces 217a of the fibers of the flexible optical circuit 250 and the lenses 230 to minimize losses. Anti-reflective elements or coatings also may be interposed to enhance optical return loss characteristics. The other sides of the lenses 230 are abutted to the adapter aligned with light paths 261 defined by the adapter, which, in turn, are aligned with the end faces of the optical fibers 271 in the external connectors 109. Again, an index matching material may be placed between the lenses 230 and the adapters 115 and/or connectors 109.

The aforedescribed cassette embodiment is merely one embodiment of the present invention. In other embodiments, there may be no housing or the housing may be flexible. For instance, connectors may be incorporated into the flexible optical circuits in other embodiments. Specifically, the lenses may be incorporated into conventional connectors mounted on the flexible optical circuit which can then be mated to the opposing complementary connectors.

Figure 5:
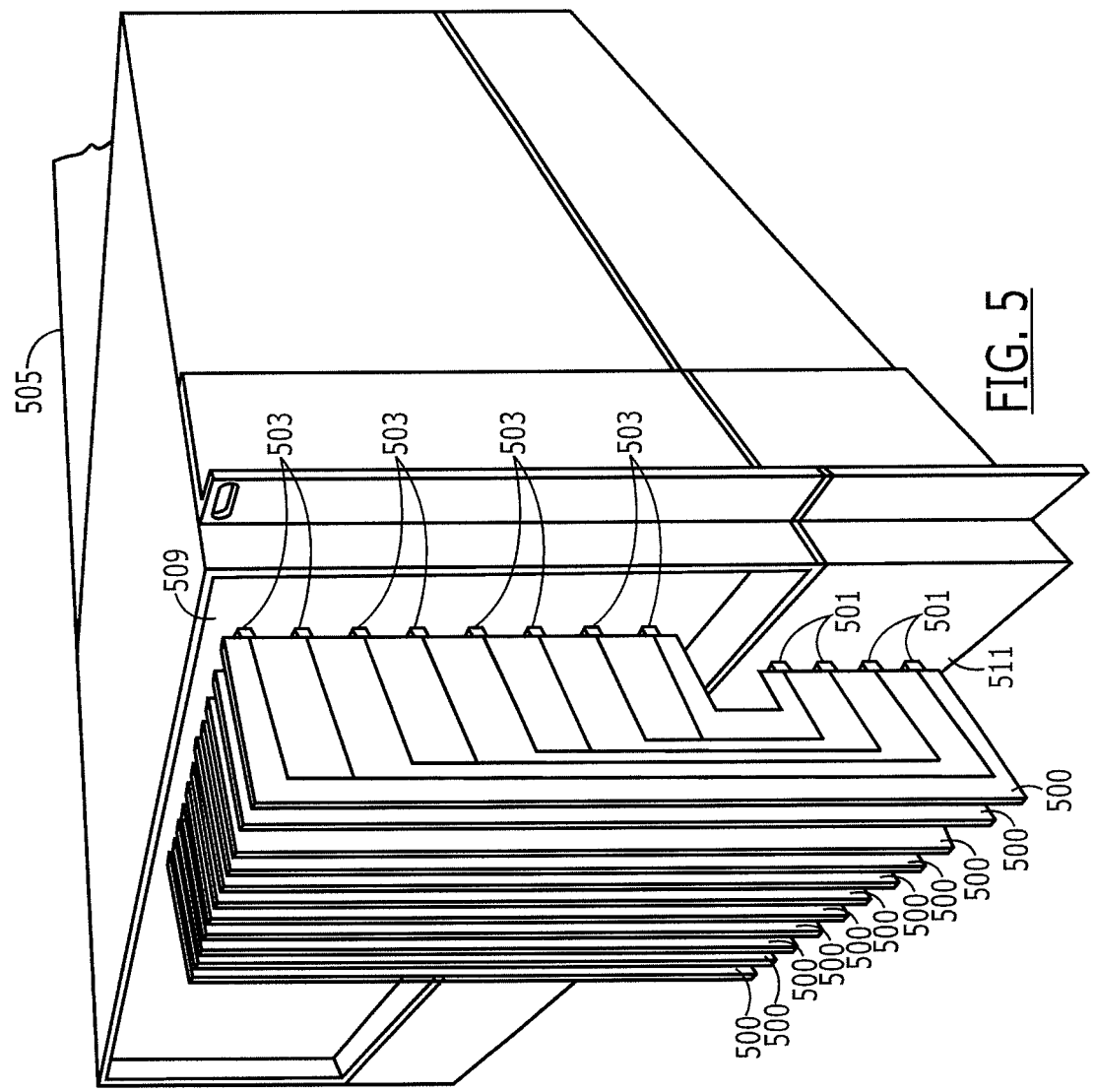
FIG. 5 is a diagram illustrating an embodiment of the invention used for making optical connections between patch panels in an equipment rack.

FIG. 5, for instance, illustrates an optical interconnect 500 in accordance with the principles of the present invention being used to break out optical signals from a set of four multi-fiber connectors 501 (each connector, in turn, comprising four fibers) to sixteen single fiber connectors 503 in an equipment rack 505. Particularly, FIG. 5 shows a portion of an equipment rack 505 containing a top row of vertically oriented patch panels 509 and a bottom row of vertically aligned patch panels 511. The top row of patch panels 509 comprises a plurality of vertically-oriented, dual-fiber connectors. The bottom row of patch panels comprises a plurality of four slot, vertically-oriented patch panels 511, each slot containing a connector having four fibers.

For each column, the breakouts from the bottom row of multi-fiber connectors to the top row of single fiber connectors 503 are accomplished by a series of flexible optical circuits 500 terminated with suitable connectors in accordance with the present invention. For this application, the opposing end faces of the fibers on flexible optical circuits 500 face in the same direction and are disposed adjacent the same edge of the flexible optical circuit or at least substantially collinear edges of the flexible optical circuit.

In the prior art, these connections conventionally would be made with the plurality of custom-made 1-to-4 cable assemblies with suitable connectors at each end. Accordingly, making the interconnections in just one column would require a person to plug in sixteen (12+4) different connectors in what is likely to be a very tight space because, presumably, there are already other cables and connectors all around the connections that need to be made. In addition, the rack very likely may be in a data center comprising scores or hundreds of such racks closely packed, making for a very cramped working environment.

Using the flexible optical circuit interconnector 500 of the present invention, those sixteen connections can be made simultaneously by properly aligning the flexible optical circuit interconnector 500 of the present invention with the connectors on the appropriate patch panels 509, 511 and pushing it in all at once to engage all sixteen connectors simultaneously.

For this type of application, the flexible optical circuits can be made rigid enough to allow such pushing without crumpling of the flexible optical circuit, yet flexible enough to flex or stretch to account for any misalignment between the two patch panels 509, 511 involved in the connection.

In other embodiments, a jig may be provided for supporting the flexible optical circuit 500 while it is being pushed in. Such a jig can be as simple as two parallel plates of plexiglass spaced apart from each other enough to slip the flexible optical circuit 500 between the two plates, with the front end (the end including the connectors) sticking out slightly so that they can engage the mating connectors or adapters in the patch panels 509, 511 while the majority of the flexible optical circuit is supported by the plates to prevent it from bending, folding, or mutilating.

Figure 6:
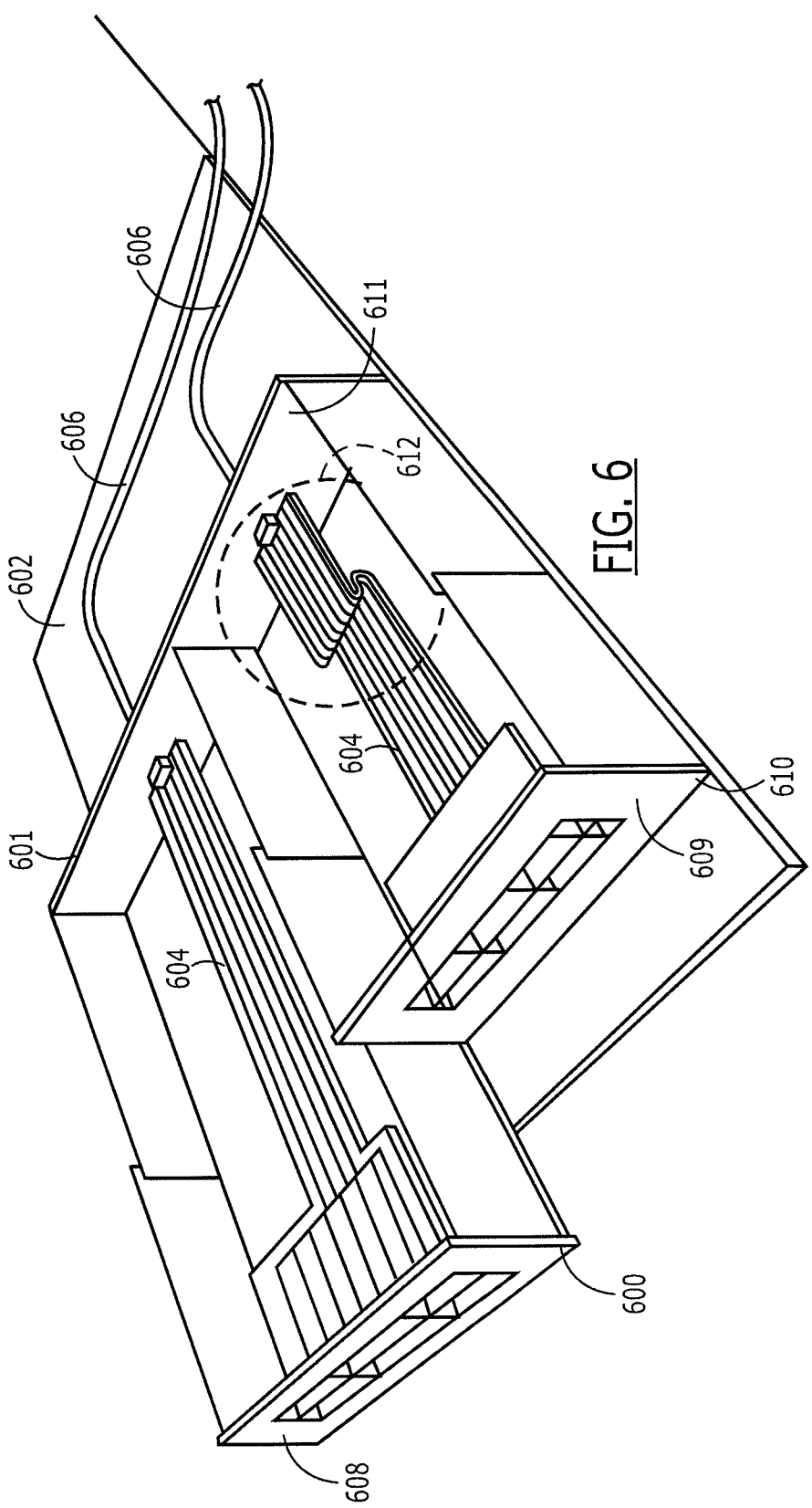
FIG. 6 is a diagram illustrating the principles of the present invention incorporated into a variable depth rack mount enclosure.

FIG. 6 illustrates another use for the present invention in a rack drawer. In the prior art, when optical cables are terminated to rack drawers that can slide in and out of the rack telescopically, excess cable had to be provided hanging out of the back of the rack or entangled with adjacent cables or hardware so that there would be enough excess cable to allow the drawer to be pulled out without tensioning the cables.

In accordance with the present invention, the slack needed to allow the drawers 600, 610 to slide in and out of the rack 602 can be provided within the drawer itself by using a flexible optical circuit 604 of the present invention within the drawer 600, 610 to interconnect the cables 606 at the back panels 601, 611 of the drawers 600, 610 with the patch panels 608, 609 at the fronts of the drawers. The flexible optical circuit 604 is made long enough to accommodate the drawer being pulled all the way out to its front stops, as shown with the upper left drawer 600 in FIG. 6, but can fold up on itself to allow the drawer to be pushed all the way to its rear stops, as shown with the lower, right hand drawer 610 (note: fold 612).

Figure 7:
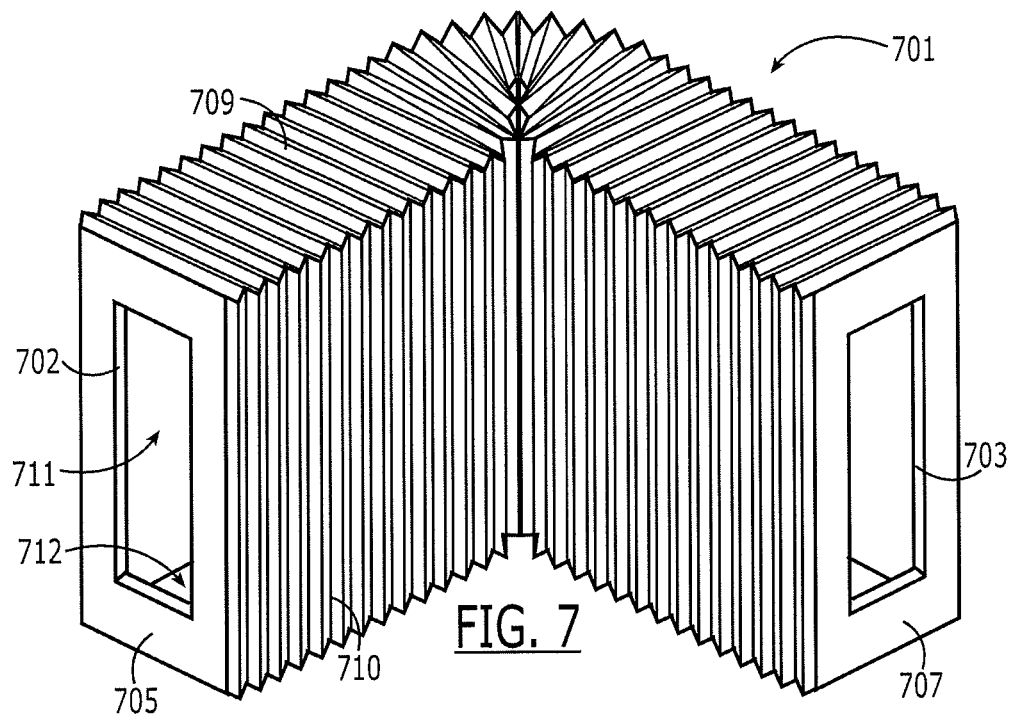
FIG. 7 is a depiction of a variable depth cassette in accordance with one embodiment of the invention.

In yet other embodiments, the flexible optical circuit and/or the housing that it is embodied within may be corrugated in the manner of an accordion so that the flexible optical circuit and its housing can be stretched and compressed longitudinally as well as bent into a compound curve. FIG. 7 illustrates a housing 701 constructed in accordance with such an embodiment. In such an embodiment, for instance, the front and back panels 705, 707 of the housing 701 bearing windows 702, 703 for receiving adapters (also not shown) that will accept the connectors (not shown) of the optical components that will be optically connected through the housing 701 may be made rigid, whereas the side walls 709, 710, 711, 712 are made of a flexible material that can be folded and compressed and stressed in the manner of an accordion, as illustrated. Alternately, the side walls may be telescopically expandable and contractable.

The flexible optical circuit that will go on the housing 701 may be corrugated in a similar manner to that described above in connection with the housing 701 to make it extendible in length as well as bendable. However, alternately, the flexible optical circuit may be formed into an S shape along its length (as shown in FIG. 6—see 612) so that the linear distance between its longitudinal ends and depths of the folds can increase and decrease to accommodate the changing linear distance between the opposite ends 705, 707 of the housing (and consequently the linear distance between the opposing ends of the fibers) similarly to what is illustrated in FIG. 6. Care must be taken so as not to bend the optical fibers too sharply in the corrugations or S curves such that they might break or at least allow light to escape from the cores. However, many manufacturers now offer fibers that can be bent to very small radii curves without breakage or significant signal loss.

Figure 8:
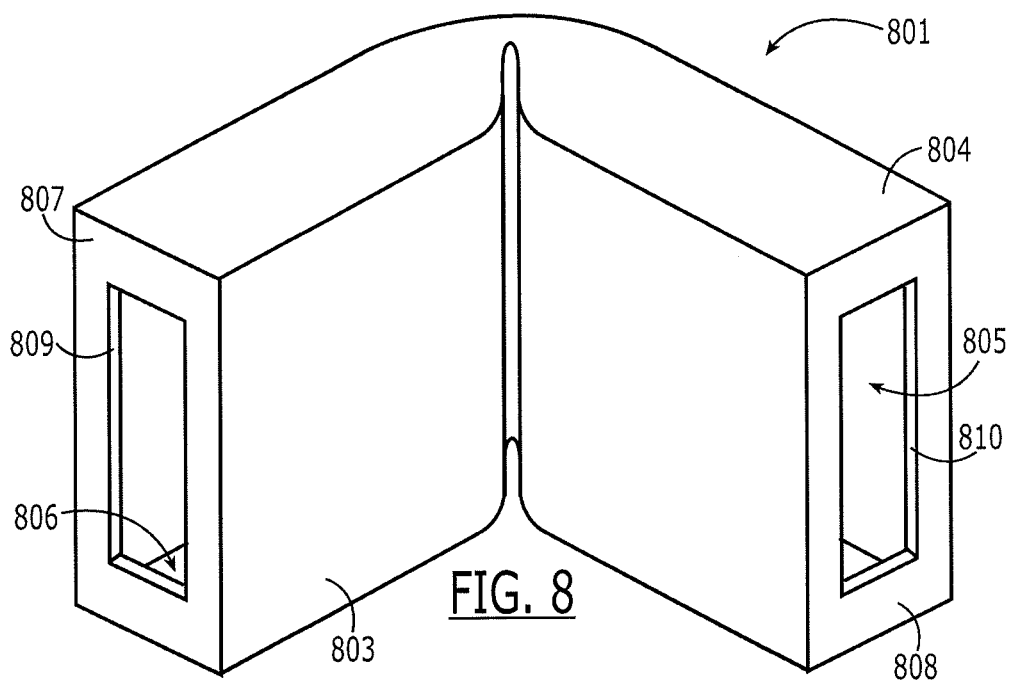
FIG. 8 is a depiction of another cassette in accordance with the principles of the present invention that is flexible.

In yet other embodiments, such as illustrated in FIG. 8, the entire housing 801 or at least the side walls 803, 804, 805, 806 (the walls interconnecting the panels 807, 808 that bear the apertures 809, 810 for receiving the external connectors and/or adapters) may be made of a flexible material such as rubber so that the housing 801 can be bent to accommodate situations in which the optical components to be interconnected by the device cannot be longitudinally aligned.

Figure 9:
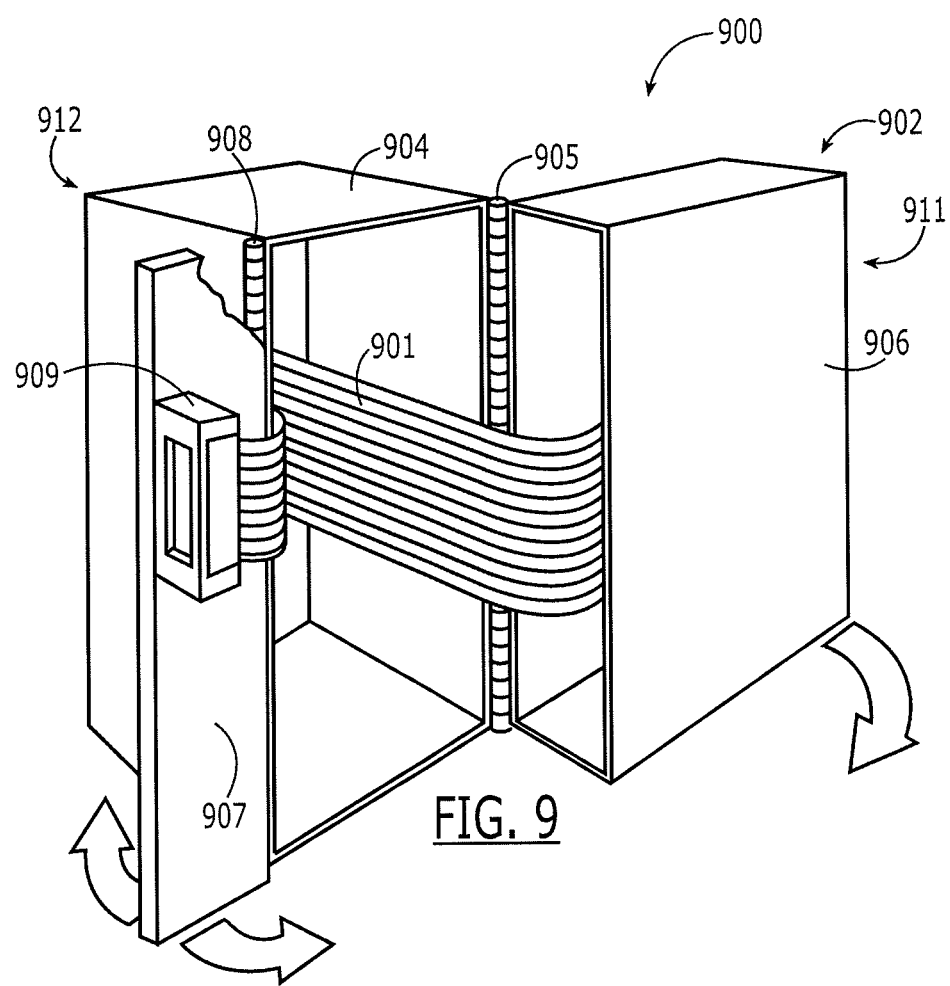
FIG. 9 is a depiction of yet another cassette in accordance with the principles of the present invention that is bendable about a hinge.

FIG. 9 illustrates yet a further embodiment of a device 900 in which the flexible optical circuit 901 is incorporated into a housing 902 that comprises hinged members 904, 906. Specifically, housing 902 comprises two housing pieces 904, 906 joined at a hinge 905 so that the two housing pieces 904, 906 may be disposed relative to each other at different angular orientations about the hinge 905. While housing 902 is shown having an open configuration, it alternately could be closed, such as by adding a third, curved housing member (not shown) inside of the other two members 904, 906 that encloses the internal space of the device 900 and that pieces 904, 906 can slide over as they pivot about hinge 905 relative to each other.

The two lens blocks (not seen) may be disposed on the opposing end faces 911, 912 of the housing 902. However, the illustrated embodiment shows a more adaptable configuration that further includes an additional panel 907 connected to housing piece 904 via a second hinge 908. The lens block 909 is mounted on the panel 907, which can be pivoted about hinge 908 to provide additional freedom in positioning the ends of the flexible optical circuit relative to each other.

Situations in which the present invention is useful are bountiful. For instance, because there are no internal connectors, the flexible optical circuit interconnector of the present invention can be made very thin. Particularly, it may comprise a housing that, other than the end faces that receive the external connectors, merely need be thick enough to house the flexible optical circuit (and accommodate any necessary curvature thereof, such as corrugations or an S curve as mentioned previously). In fact, also as previously noted, in some embodiments, there may be no housing at all and adapters or other structure for receiving the external connectors may be incorporated directly on the flexible optical circuit adjacent the end faces of the fibers and the lenses. Accordingly, it can be used for very low profile surface-mounted boxes for use in wall-mounted interconnects in office buildings, etc. It also can be used for interconnects in modular furniture pieces, which often provide very small spaces for electrical or optical equipment.

Yet further, it is envisioned that a wide variety of optical interconnects can be made modularly from a relatively small number of parts. Particularly, there would need to be a flexible optical circuit for each different optical routing pattern type (e.g., 1-to-12 cable breakout (such as illustrated in FIG. 2), 1-to-4 breakout, 1-to-4 optical splitter, etc.) However, note that a single lensed flexible optical circuit could be used for various different numbers of such breakouts. For instance, a lensed flexible optical circuit in accordance with the present invention that provides fiber routing for ten 1 to 4 breakouts may be used in an optical cassette to provide anywhere from one 1-to-4 breakout to ten 1-to-4 breakouts. If the cassette needs to offer less than ten such breakouts, then some of the fibers/lenses simply are not used.

Since the lensed flexible optical circuits are flexible, they can be bent to accommodate many different physical layouts. The lensed flexible optical circuits may be constructed of a sufficient length to accommodate most of the longest practical applications since they can simply be folded up for the shorter applications. In cassette type applications or other applications involving a housing, a modular set of multiple housing pieces adapted to be modularly joined to each other in various combinations may be provided. The housing components may provide for hinged and/or fixed joining. One or more of the housing components may be flexible. Thus, it is possible to create almost any housing shape and place one of the lensed flexible optical circuits within it. The housing components may include perture walls adapted to accept adapters and/or connectors of any form factor.

While the invention has been described herein in connection embodiments employing molded lenses, it will be understood that this is merely exemplary and that other optical components capable of guiding light may be disposed at the ends of the fibers in the flexible optical circuits (or embedded in the laminate at the ends of the fibers) such. Light-guiding, fiber terminating optical components include, but are not limited to, diffraction gratings, Escalier gratings, mirrors, and holograms.

Figure 10:
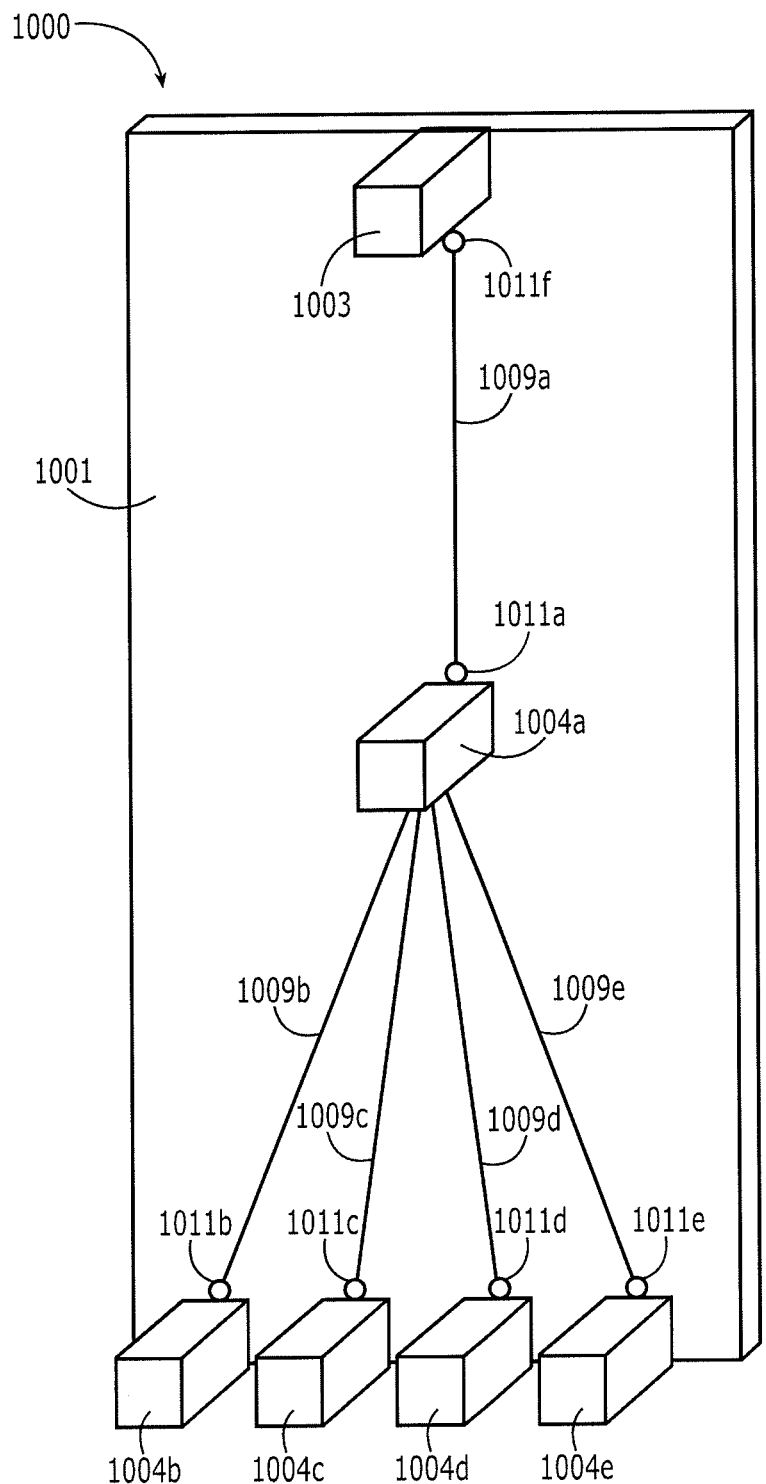
FIG. 10 is a depiction of an optical splitter in accordance with the principles of the present invention.

It further should be understood that not all of the connections need to be made at the opposing ends of the laminate strip. For instance, FIG. 10 illustrates a flexible optical circuit 1001 in accordance with the present invention implemented as an optical splitter 1000. Such a splitter may be incorporated into a passive optical network (PON), for instance. The lensed flexible optical circuit has an input connector 1003 at one longitudinal edge of the flexible optical circuit 1001 and five output connectors 1004a-1004e. Appropriate optical fibers 1009a-1009e and lenses 1011a-1011f are disposed on the circuit 1001 in accordance with the principles of the present invention as previously described to distribute the input signal received through input connector 1003 to the five output connectors 1004a-1004e. Four of those output connectors 1004b-1004e are located at the opposing longitudinal edge of the flexible optical circuit, but one of the output connectors 1004a is disposed in the middle of the flexible optical circuit 1001. In this particular exemplary embodiment, the lens 1011a adjacent the middle output connector 1004a is configured to operate as a splitter. For instance, it may be an expanded beam lens that increases the diameter of the beam received on input fiber 1009a and couples it into the four output fibers 1009b-1009e as well as directly into middle connector 1004a. Additional lenses may be disposed in front of the output fibers 1009b-1009e in order to focus the beams back into the output fibers. This intermediate point can be employed, for instance, for monitoring signals or optical power in the circuit without interrupting transmission in that device.

Yet further, the principles of the present invention can be used to replace patch panels in equipment racks in data centers. Optical interconnections can be made in such a small, thin space using the present invention that such optical interconnects may be disposed in unoccupied air space within equipment racks that are otherwise fully occupied so as to provide even more dense optical interconnections in existing equipment racks.

In yet other embodiments, electrically conductive wires also may be embedded within the flexible optical circuit along with the optical fibers in order to provide both electrical and optical connectivity in one device. Applications with a need for combined optical and electrical connectivity abound, such as power over Ethernet applications and out of band signaling applications, such as disclosed in U.S. Pat. No. 7,433,915.

Having thus described particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An optical cassette comprising:
a cassette housing defining an interior and an exterior;
a flexible optical circuit defined by a flexible substrate positioned within the interior of the cassette housing, the flexible substrate physically supporting a plurality of optical fibers and leading the plurality of optical fibers to a plurality of optical adapters located on the cassette housing, wherein each optical adapter defines a first side and an opposite second side, wherein the first side is configured to receive an optical connector selected from the group consisting of an SC connector, an LC connector, an ST connector, and an MPO connector coming from the exterior of the cassette housing and the second side is configured to receive a light-guiding, fiber termination optical element that is not any of an SC connector, an LC connector, an ST connector, or an MPO connector from the interior of the cassette housing for mating with the optical connector coming from the exterior of the cassette housing, the light-guiding, fiber termination optical element having a different format than the optical connector coming from the exterior of the cassette housing, wherein each light-guiding, fiber termination optical element terminates one of the fibers supported by the flexible substrate.

2. An optical cassette according to claim 1, wherein each optical connector selected from the group consisting of an SC connector, an LC connector, an ST connector, and an MPO connector coming from the exterior of the cassette housing includes an optical ferrule and each light-guiding, fiber termination optical element defines an element selected from the group consisting of a lens, a diffraction grating, an Escalier grating, a mirror, and a hologram.

3. An optical cassette according to claim 1, wherein the plurality of optical fibers includes at least twelve optical fibers.

4. An optical cassette according to claim 1, wherein end faces of each of the optical fibers supported by the flexible substrate are terminated into a polymer block adjacent the plurality of optical adapters.

5. An optical cassette according to claim 1, wherein the light-guiding, fiber termination optical elements within the interior of the cassette are physically mounted on the flexible substrate.

6. An optical cassette according to claim 1, further comprising a first optical connector selected from the group consisting of an SC connector, an LC connector, an ST connector, and an MPO connector coupled to the cassette housing, the first optical connector terminating a cable carrying the plurality of optical fibers that extend into the interior of the cassette housing and that are physically supported by the flexible substrate, the optical connectors selected from the group consisting of an SC connector, an LC connector, an ST connector, and an MPO connector coming from the exterior of the cassette housing being second optical connectors that are different than the first optical connector, and the light-guiding, fiber termination optical elements that are within the interior of the cassette housing being third light-guiding, fiber termination optical elements having a different format than both the first optical connector and the second optical connectors.

7. An optical cassette according to claim 6, wherein the cassette housing defines a front side and a rear side, the first optical connector positioned at the rear side and the plurality of optical adapters positioned at the front side with the flexible substrate positioned therebetween.

8. An optical cassette according to claim 7, wherein the flexible substrate is configured to allow bending in a direction generally perpendicular to a direction extending from the front side to the rear side of the cassette housing.

9. An optical cassette according to claim 6, wherein the first optical connector is an MPO connector.

10. An optical cassette according to claim 6, wherein both the second optical connectors and the first optical connector include optical ferrules.

* * * * *